US012764475B2

(12) United States Patent
Yan et al.

(10) Patent No.: US 12,764,475 B2
(45) Date of Patent: Oct. 13, 2026

(54) METHODS AND SYSTEMS FOR EVALUATING HEARING THRESHOLD OF USER AFTER USING BONE-CONDUCTION HEARING AID

(71) Applicant: SHENZHEN SHOKZ CO., LTD., Shenzhen (CN)

(72) Inventors: Bingyan Yan, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 52 days.

(21) Appl. No.: 18/784,892

(22) Filed: Jul. 25, 2024

(65) Prior Publication Data

US 2024/0381037 A1 Nov. 14, 2024

Related U.S. Application Data

(63) Continuation of application No. PCT/CN2022/110482, filed on Aug. 5, 2022.

(51) Int. Cl.
*H04R 25/00* (2006.01)

(52) U.S. Cl.
CPC ........... *H04R 25/30* (2013.01); *H04R 25/606* (2013.01); *H04R 25/70* (2013.01)

(58) Field of Classification Search
CPC ....... H04R 25/30; H04R 25/606; H04R 25/70
See application file for complete search history.

(56) References Cited

U.S. PATENT DOCUMENTS

2007/0258609 A1 11/2007 Steinbuss
2008/0253595 A1* 10/2008 Steinbuss ............... H04R 25/70 381/312
2010/0041940 A1* 2/2010 Hillbratt ................ H04R 25/70 600/25
2011/0071339 A1* 3/2011 Rosenbom ............. H04R 25/70 600/25
2013/0156202 A1* 6/2013 Hamacher .............. H04R 25/43 381/23.1

(Continued)

FOREIGN PATENT DOCUMENTS

CN 104144374 A 11/2014
CN 105228069 A 1/2016
CN 107948898 A 4/2018

OTHER PUBLICATIONS

International Search Report in PCT/CN2022/110482 mailed on Dec. 22, 2022, 7 pages.

(Continued)

*Primary Examiner* — Joseph Saunders, Jr.
(74) *Attorney, Agent, or Firm* — METIS IP LLC

(57) ABSTRACT

One or more embodiments of the present disclosure relates to a method and system for evaluating a hearing threshold of a user after using a bone-conduction hearing aid. The method includes obtaining a bone-conduction hearing threshold of the user; obtaining a bone-conduction component input-output curve of the bone-conduction hearing aid; and determining the hearing threshold of the user after using the bone-conduction hearing aid based on the bone-conduction hearing threshold of the user and the bone-conduction component input-output curve of the bone-conduction hearing aid.

20 Claims, 12 Drawing Sheets

300

(56) References Cited

U.S. PATENT DOCUMENTS

| | | | | |
|---|---|---|---|---|
| 2013/0223634 A1* | 8/2013 | Rieger | H04R 25/70 | |
| | | | 381/23.1 | |
| 2017/0118563 A1* | 4/2017 | Maas | H04R 25/606 | |

OTHER PUBLICATIONS

Written Opinion in PCT/CN2022/110482 mailed on Dec. 22, 2022, 5 pages.

Mo, Lingyan, Advances in Electrophysiological Techniques for Hearing Threshold Evaluation, Chinese Journal of Otology, 2012, 16 pages.

* cited by examiner

METHODS AND SYSTEMS FOR EVALUATING HEARING THRESHOLD OF USER AFTER USING BONE-CONDUCTION HEARING AID

CROSS-REFERENCE TO RELATED APPLICATIONS

This application is a continuation of International Application No. PCT/CN2022/110482, filed on Aug. 5, 2022, the contents of which are incorporated herein by reference in their entirety.

TECHNICAL FIELD

The present disclosure relates to the technical field of hearing aids, and in particular, to methods and systems for evaluating a hearing threshold of a user after using a bone-conduction hearing aid.

BACKGROUND

With the development of science and technology, the emergence of hearing aids has made it possible for hearing-impaired people to hear sounds. The hearing-impaired people can lower their hearing thresholds by using hearing aids. Therefore, by obtaining hearing thresholds after using the hearing aids, it is possible to determine the effect of the hearing aids on hearing-impaired people. Bone-conduction hearing aids have a more complex sound transmission principle, and the acquisition of hearing thresholds after using the hearing aids requires a more stringent test environment and test equipment, which brings challenges to the acquisition of hearing thresholds after using the hearing aids.

Therefore, it is desirable to provide a method for evaluating a hearing threshold of a user after using a bone-conduction hearing aid to improve the accuracy and expediency of determining the hearing threshold after using the bone-conduction hearing aid.

SUMMARY

One of the embodiments of the present disclosure provides a method for evaluating a hearing threshold of a user after using a bone-conduction hearing aid. The method includes obtaining a bone-conduction hearing threshold of the user; obtaining a bone-conduction component input-output curve of the bone-conduction hearing aid; and determining the hearing threshold of the user after using the bone-conduction hearing aid based on the bone-conduction hearing threshold of the user and the bone-conduction component input-output curve of the bone-conduction hearing aid.

In some embodiments, the obtaining a bone-conduction component input-output curve includes: obtaining a bone-conduction output curve of a left ear of the user and a bone-conduction output curve of a right ear of the user; and obtaining a corrected bone-conduction output curve of the left ear and a corrected bone-conduction output curve of the right ear by correcting an intensity of a bone-conduction component in the bone-conduction output curve of the left ear and an intensity of a bone-conduction component in the bone-conduction output curve of the right ear.

In some embodiments, the correcting an intensity of a bone-conduction component in the bone-conduction output curve of the left ear and an intensity of a bone-conduction component in the bone-conduction output curve of the right ear includes: adding a transmission bone-conduction component from the right ear to the left ear to the intensity of the bone-conduction component in the bone-conduction output curve of the left ear; and adding a transmission bone-conduction component from the left ear to the right ear to the intensity of the bone-conduction component in the bone-conduction output curve of the right ear.

In some embodiments, the obtaining a bone-conduction component input-output curve includes: determining the bone-conduction component input-output curve based on at least one preset parameter of the bone-conduction hearing aid.

In some embodiments, the obtaining a bone-conduction component input-output curve includes: obtaining a sound pressure of a test air-conduction sound and a bone-conduction force level generated by the bone-conduction hearing aid under the action of the test air-conduction sound; and determining the bone-conduction component input-output curve based on the sound pressure of the test air-conduction sound and the bone-conduction force level.

In some embodiments, the method further includes: obtaining an air-conduction hearing threshold of the user; and obtaining an air-conduction component input-output curve of the bone-conduction hearing aid. The determining the hearing threshold of the user after using the bone-conduction hearing aid includes: determining the hearing threshold of the user after using the bone-conduction hearing aid based on the air-conduction hearing threshold, the air-conduction component input-output curve, the bone-conduction hearing threshold, and the bone-conduction component input-output curve.

In some embodiments, the obtaining an air-conduction component input-output curve includes: determining the air-conduction component input-output curve based on at least one preset parameter of the bone-conduction hearing aid.

In some embodiments, the obtaining an air-conduction component input-output curve includes: obtaining the sound pressure of the test air-conduction sound and an air-conduction sound pressure generated by the bone-conduction hearing aid under the action of the test air-conduction sound; and determining the air-conduction component input-output curve based on the sound pressure of the test air-conduction sound and the bone-conduction force level.

In some embodiments, the method further includes: obtaining a perception threshold curve of the user for a bone-conduction sound and an air-conduction sound; and determining the hearing threshold of the user after using the bone-conduction hearing aid based on the perception threshold curve, the air-conduction hearing threshold, the air-conduction component input-output curve, the bone-conduction hearing threshold, and the bone-conduction component input-output curve.

In some embodiments, the method further includes: correcting a sound field hearing threshold of the user; correcting the hearing threshold after using the bone-conduction hearing aid; and determining a hearing aid gain based on the corrected sound field hearing threshold of the user and the corrected hearing threshold after using the bone-conduction hearing aid.

One of the embodiments of the present disclosure provides a system for evaluating a hearing threshold of a user after using a bone-conduction hearing aid. The system includes a bone-conduction component obtaining module configured to obtain a bone-conduction hearing threshold of the user and a bone-conduction component input-output curve of the bone-conduction hearing aid; and a processing module configured to determine the hearing threshold of the user after using the bone-conduction hearing aid based on the bone-conduction hearing threshold of the user and the bone-conduction component input-output curve of the bone-conduction hearing aid.

In some embodiments, the obtaining a bone-conduction component input-output curve includes: obtaining a bone-conduction output curve of a left ear of the user and a bone-conduction output curve of a right ear of the user; and obtaining a corrected bone-conduction output curve of the left ear and a corrected bone-conduction output curve of the right ear by correcting an intensity of a bone-conduction component in the bone-conduction output curve of the left ear and an intensity of a bone-conduction component in the bone-conduction output curve of the right ear.

In some embodiments, the correcting an intensity of a bone-conduction component in the bone-conduction output curve of the left ear and an intensity of a bone-conduction component in the bone-conduction output curve of the right ear includes: adding a transmission bone-conduction component from the right ear to the left ear to the intensity of the bone-conduction component in the bone-conduction output curve of the left ear; and adding a transmission bone-conduction component from the left ear to the right ear to the intensity of the bone-conduction component in the bone-conduction output curve of the right ear.

In some embodiments, the obtaining a bone-conduction component input-output curve includes: determining the bone-conduction component input-output curve based on at least one preset parameter of the bone-conduction hearing aid.

In some embodiments, the obtaining a bone-conduction component input-output curve includes: obtaining a sound pressure of a test air-conduction sound and a bone-conduction force level generated by the bone-conduction hearing aid under the action of the test air-conduction sound; and determining the bone-conduction component input-output curve based on the sound pressure of the test air-conduction sound and the bone-conduction force level.

In some embodiments, the system further includes an air-conduction component obtaining module configured to obtain an air-conduction hearing threshold of the user; and obtain an air-conduction component input-output curve of the bone-conduction hearing aid. The determining the hearing threshold of the user after using the bone-conduction hearing aid includes: determining the hearing threshold of the user after using the bone-conduction hearing aid based on the air-conduction hearing threshold, the air-conduction component input-output curve, the bone-conduction hearing threshold, and the bone-conduction component input-output curve.

In some embodiments, the obtaining an air-conduction component input-output curve includes: determining the air-conduction component input-output curve based on at least one preset parameter of the bone-conduction hearing aid.

In some embodiments, the obtaining an air-conduction component input-output curve includes: obtaining a sound pressure of a test air-conduction sound and an air-conduction sound pressure generated by the bone-conduction hearing aid under the action of the test air-conduction sound; and determining the air-conduction component input-output curve based on the sound pressure of the test air-conduction sound and a bone-conduction force level.

In some embodiments, the system further includes a perception threshold curve simulation module configured to: obtain a perception threshold curve of the user for a bone-conduction sound and an air-conduction sound; and determine the hearing threshold of the user after using the bone-conduction hearing aid based on the perception threshold curve, the air-conduction hearing threshold, the air-conduction component input-output curve, the bone-conduction hearing threshold, and the bone-conduction component input-output curve.

In some embodiments, the system further includes a hearing threshold correction module configured to: correct a sound field hearing threshold of the user; correct the hearing threshold after using the bone-conduction hearing aid; and determine a hearing aid gain based on the corrected sound field hearing threshold of the user and the corrected hearing threshold after using the bone-conduction hearing aid.

Embodiments of the present disclosure further provide a device for evaluating a hearing threshold of a user after using a bone-conduction hearing aid. The device includes a processor and a memory, wherein the memory is configured to store instructions, and when the instructions are executed by the processor, the device implements the above-mentioned method for evaluating the hearing threshold of the user after using the bone-conduction hearing aid.

Embodiments of the present disclosure also provide a computer-readable storage medium, wherein the storage medium stores computer instructions, and when reading the computer instructions in the storage medium, a computer executes the above-mentioned method for evaluating the hearing threshold of the user after using the bone-conduction hearing aid.

BRIEF DESCRIPTION OF THE DRAWINGS

The present disclosure is further illustrated in terms of exemplary embodiments. These exemplary embodiments are described in detail with reference to the drawings. These embodiments are not limiting, and in these embodiments, the same numbering denotes the same structure, wherein.

DETAILED DESCRIPTION

Figure 1:
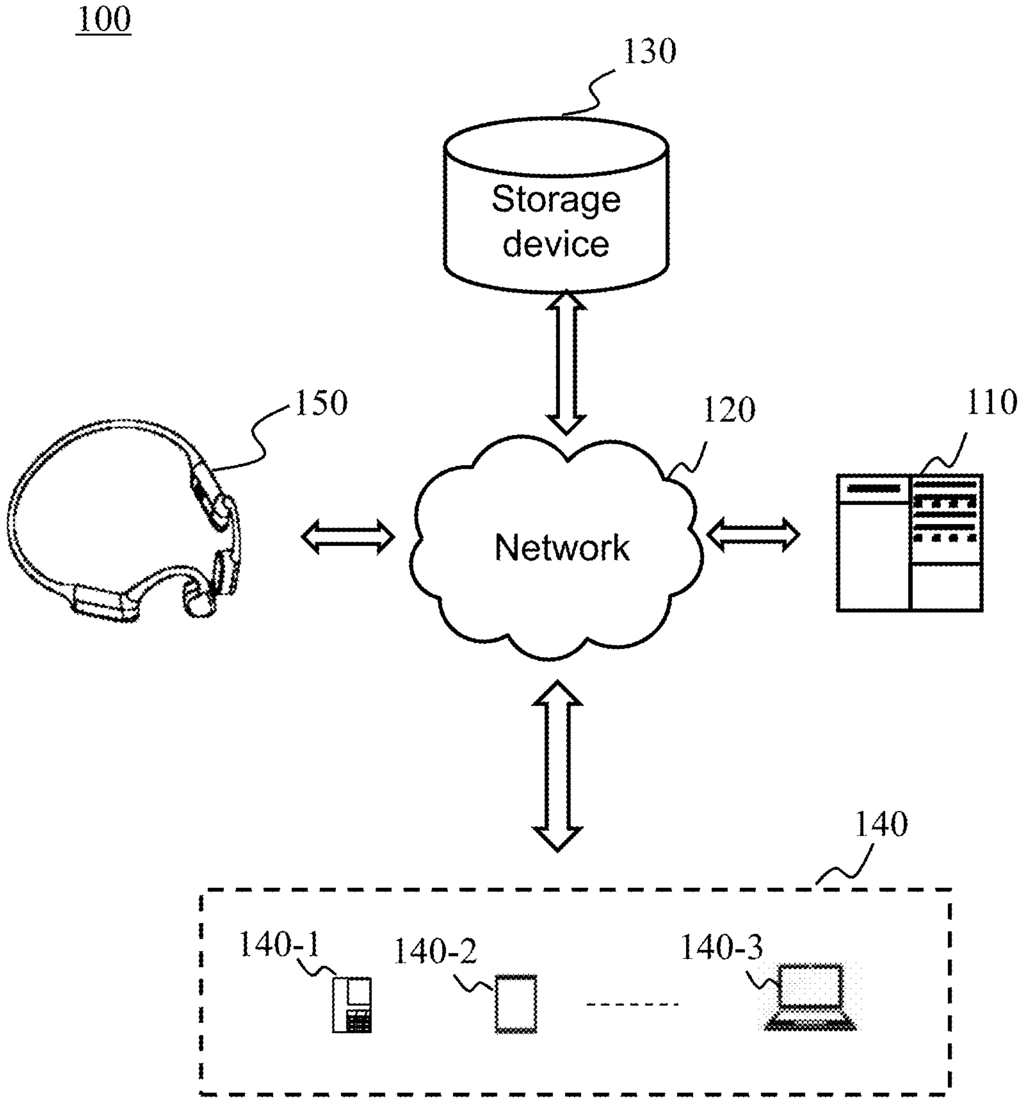
FIG. 1 is a schematic diagram illustrating an exemplary application scenario of a system for evaluating a hearing threshold of a user after using a bone-conduction hearing aid according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios based on the accompanying drawings without creative labor. Unless obviously obtained from the context or the context illustrates otherwise, the same numeral in the drawings refers to the same structure or operation.

It should be understood that as used herein, the terms "system", "device", "unit" and/or "module" are used herein as a way to distinguish between different components, elements, parts, sections, or assemblies at different levels. However, the words may be replaced by other expressions if other words accomplish the same purpose.

As shown in the present disclosure and the claims, unless the context clearly suggests an exception, the words "one," "a", "an", "one kind", and/or "the" do not refer specifically to the singular, but may also include the plural. Generally, the terms "including" and "comprising" suggest only the inclusion of clearly identified steps and elements that do not constitute an exclusive list, and the method or apparatus may also include other steps or elements.

Flowcharts are used in this application to illustrate operations performed by a system according to the embodiments of this application. It should be appreciated that the preceding or following operations are not necessarily performed in an exact sequence. Instead, steps can be processed in reverse order or simultaneously. Also, it is possible to add other operations to these processes, or to remove a step or steps from these processes.

Embodiments of the present disclosure provide a method for evaluating a hearing threshold of a user after using a bone-conduction hearing aid. In some embodiments, the method may include obtaining a bone-conduction hearing threshold of the user; obtaining a bone-conduction component input-output curve of the bone-conduction hearing aid; and determining the hearing threshold of the user after using the bone-conduction hearing aid based on the bone-conduction hearing threshold of the user and the bone-conduction component input-output curve of the bone-conduction hearing aid. When the user wears a bone-conduction vibrator in one ear, by the method described above, the hearing threshold of the user after using the bone-conduction hearing aid can be easily determined without the need for a rigorous test environment and test equipment, which improves the convenience and speed of determining the hearing threshold of the user after using the bone-conduction hearing aid. When the user wears bone-conduction vibrators in both ears, the user's left ear can not only receive a bone-conduction sound output by the bone-conduction vibrator in the left ear, but also receive a bone-conduction sound output by the bone-conduction vibrator in the right ear. Similarly, the user's right ear can not only receive the bone-conduction-sound output by the bone-conduction vibrator in the right ear, but also receive the bone-conduction sound output by the bone-conduction vibrator in the left ear. Based on this, in order to improve the accuracy of the hearing threshold of the user after using the bone-conduction hearing aid, in some embodiments, the method for evaluating the hearing threshold may further includes obtaining a bone-conduction output curve of the user's left ear and a bone-conduction output curve of the user's right ear and correcting the bone-conduction output curves. When the bone-conduction vibrator vibrates, it can drive a housing and air inside the housing to vibrate, and a vibration of the housing causes air outside the housing to vibrate as well, which generates an air-conduction sound, and the air-conduction sound may serve as a gain of the bone-conduction hearing aid to be transmitted to the user's ear, thereby affecting the accuracy of predicting the hearing threshold of the user after using the bone-conduction hearing aid. In order to further improve the accuracy of the hearing threshold of the user after using the bone-conduction hearing aid, in some embodiments, the method may also include obtaining an air-conduction hearing threshold of the user; and obtaining an air-conduction component input-output curve of the bone-conduction hearing aid, and determining the hearing threshold of the user after using the bone-conduction hearing aid based on the air-conduction hearing threshold, the air-conduction component input-output curve, the bone-conduction hearing threshold, and the bone-conduction component input-output curve. When the bone-conduction sound and the air-conduction sound exist at the same time (i.e., the bone-conduction component and the air-conduction component exist at the same time), they will be superimposed at the cochlea of the user. In such cases, there exists a situation in which the bone-conduction component and the air-conduction component are both lower than a bone-conduction hearing threshold and an air-conduction hearing threshold of the user, but the bone-conduction component and air-conduction component superimposed together can be heard by the user. In order to further improve the accuracy of the hearing threshold of the user after using the bone-conduction hearing aid, in some embodiments, the method may also include obtaining a perception threshold curve of the user for the bone-conduction sound and the air-conduction sound; and determining the hearing threshold of the user after using the bone-conduction hearing aid based on the perception threshold curve, the air-conduction hearing threshold, the air-conduction component input-output curve, the bone-conduction hearing threshold, and the bone-conduction component input-output curve. In some embodiments, the method for evaluating the hearing threshold may further include correcting a sound field hearing threshold of the user, correcting the hearing threshold after using the bone-conduction hearing aid, and determining a hearing aid gain based on the corrected sound field hearing threshold of the user and the corrected hearing threshold after using the bone-conduction hearing aid. In determining the hearing threshold of the user after using the bone-conduction hearing aid, the method provided in the present disclosure takes into account the effect of the mutual transmission of a sound generated by the bone-conduction hearing aid on the left and right ears through the skull, and corrects an intensity of the bone-conduction component in the bone-conduction output curve of the left ear and an intensity of the bone-conduction component in the bone-conduction output curve of the right ear. Further, the method provided in the present disclosure also takes into account the effect of the air-conduction sound and the effect of that both the bone-conduction component and the air-conduction component are lower than the bone-conduction hearing threshold and the air-conduction hearing threshold of the user but the superimposed bone-conduction component and air-conduction component can be heard by the user, and the effect of the binaural loudness superimposition effect. By processing the above multiple effects, the accuracy and credibility of the hearing threshold of the user after using the bone-conduction hearing aid may be improved, and at the same time, stores and remote service providers that do not have the testing conditions can conveniently determine the user's hearing threshold after using the bone-conduction hearing aid without the need for a strict testing environment and testing equipment, thereby improving the convenience and speed of determining the hearing threshold of the user after using the bone-conduction hearing aid.

FIG. 1 is a schematic diagram illustrating an exemplary application scenario of a system for evaluating a hearing threshold of a user after using a bone-conduction hearing aid according to some embodiments of the present disclosure. As shown in FIG. 1, an application scenario 100 of the system for evaluating the hearing threshold of the user after using the bone-conduction hearing aid may include a processing device 110, a network 120, a storage device 130, a terminal device 140, and a bone-conduction hearing aid 150. The processing device 110, the storage device 130, the terminal device 140, and the bone-conduction hearing aid 150 may be connected and/or communicated with each other via the network 120 (e.g., a wireless connection, a wired connection, or a combination thereof). As shown in FIG. 1, the processing device 110 may be connected to the storage device 130 via the network 120. As another example, the terminal device 140 may be connected to the processing device 110 and the storage device 130 via the network 120.

The processing device 110 may be configured to process information and/or data related to application scenario 100, for example, a bone-conduction hearing threshold of the user, a bone-conduction component input-output curve, or the like. The processing device 110 may process data, information, and/or processing results obtained from other devices or system components and execute program instructions based on the data, information, and/or processing results to perform one or more of the functions described in the present disclosure. By way of example only, the processing device 110 may include a central processing unit (CPU), an application-specific integrated circuit (ASIC), an application-specific instruction set processor (ASIP), a graphics processing unit (GPU), or the like.

The network 120 may connect components of the application scenario 100 and/or connect the application scenario 100 to an external resource. The network enables communication between the components of the application scenario 100 or between the application scenario 100 and the external resource to facilitate the exchange of data and/or information. The network may be a local area network (LAN), a wide area network (WAN), the Internet, or the like, and may be a combination of multiple networks. By way of example only, the network 120 may include a cable network, a wired network, a fiber optic network, a telecommunications network, an intranet, the Internet, a local area network (LAN), or the like.

The storage device 130 may be configured to store data and/or instructions. The storage device 130 may be connected to the network 120 to communicate with one or more components (e.g., the processing device 110, the user terminal 140) of the application scenario 100. The storage device 130 may be configured to store data and/or instructions used by the processing device 110 to execute or use to accomplish the exemplary method described in the present disclosure. For example, the storage device 130 may store the bone-conduction hearing threshold of the user, an air-conduction hearing threshold of the user, etc. As another example, the storage device 130 may store an instruction for obtaining an air-conduction component input-output curve of a bone-conduction hearing aid.

The terminal device 140 may include one or more terminal devices or software. The terminal device 140 may include a cell phone 140-1, a tablet 140-2, a laptop 140-3, or the like. The terminal device 140 may be used for input and/or output. For example, the terminal device 140 may obtain the air-conduction hearing threshold of the user, the bone-conduction hearing threshold of the user, or the like, based on the user's input. As another example, the terminal device 140 may display and/or play, via a display and/or a speaker, a determined hearing threshold of the user after using the bone-conduction hearing aid.

The bone-conduction hearing aid 150 may be used to obtain sound information (e.g., an ambient sound, a wearer's voice, an audio file obtained from other devices, etc.) process obtained sound information into a vibration signal, and transmit the vibration signal to the wearer's auditory center through the wearer's bones, etc., so that the wearer may hear the sound information carried by the vibration signal.

In some embodiments, the bone-conduction hearing aid 150 may include a microphone, a bone-conduction speaker, and a signal processing system. The microphone may be used to pick up the sound information (e.g., the ambient sound, the wearer's voice) and process and convert the picked-up sound information into an electrical signal carrying the sound information. The bone-conduction speaker may convert the electrical signal carrying sound information obtained by the microphone into a vibration signal carrying the sound information and transmit the vibration signal to the auditory center of the wearer. The signal processing system may be used to process the electrical signal. An exemplary signal processing system may include, but is not limited to, an equalizer (EQ) system, a wide dynamic range compression (WDRC) system, an automatic gain control (AGC) system.

It should be noted that the application scenario 100 is provided for illustrative purposes only and is not intended to limit the scope of the present disclosure. For a person of ordinary skill in the art, a variety of modifications or variations may be made in accordance with the description of the present disclosure. For example, the application scenario may also include a database. As another example, the application scenario may be implemented on other devices to achieve similar or different functionality. However, the modifications or variations do not depart from the scope of the present disclosure.

Figure 2:
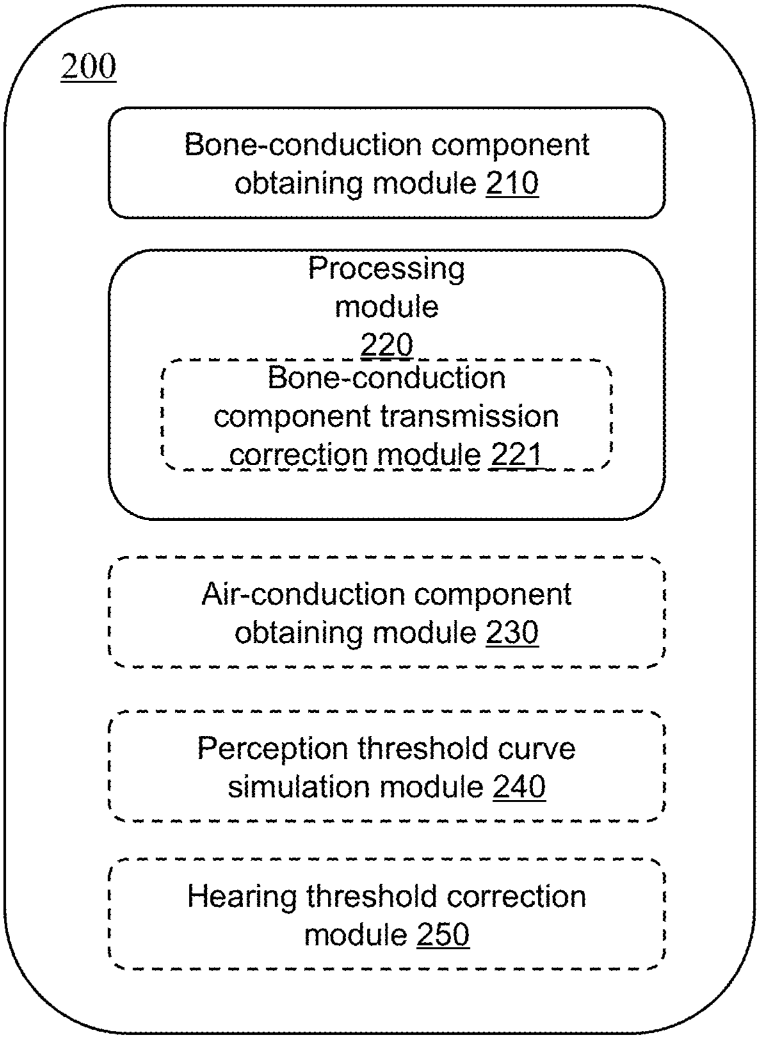
FIG. 2 is a block diagram illustrating an exemplary system for evaluating a hearing threshold of a user after using a bone-conduction hearing aid according to some embodiments of the present disclosure.

FIG. 2 is a block diagram illustrating an exemplary system for evaluating a hearing threshold of a user after using a bone-conduction hearing aid according to some embodiments of the present disclosure. As shown in FIG. 2, a system 200 for evaluating the hearing threshold of the user after using the bone-conduction hearing aid is hereinafter referred to as the system 200 for evaluating the hearing threshold. In some embodiments, the system 200 for evaluating the hearing threshold may include a bone-conduction component obtaining module 210 and a processing module 220. In some embodiments, the system 200 for evaluating the hearing threshold may be part of the processing device 110 or implemented by the processing device 110.

The bone-conduction component obtaining module 210 may be configured to obtain a bone-conduction hearing threshold of the user and a bone-conduction component input-output curve of the bone-conduction hearing aid.

The processing module 220 may be configured to determine a hearing threshold of the user after using the bone-conduction hearing aid based on the bone-conduction hearing threshold of the user and the bone-conduction component input-output curve of the bone-conduction hearing aid.

In some embodiments, the bone-conduction component obtaining module 210 may be further configured to obtain a bone-conduction output curve of a left ear of the user and a bone-conduction output curve of a right ear of the user; and the processing module 220 may include a bone-conduction component transmission correction module 221 configured to obtain a corrected bone-conduction output curve of the left ear and a corrected bone-conduction output curve of the right ear by correcting an intensity of a bone-conduction component in the bone-conduction output curve of the left ear and an intensity of a bone-conduction component in the bone-conduction output curve of the right ear.

In some embodiments, the bone-conduction component transmission correction module 221 may be further configured to add a transmission bone-conduction component from the right ear to the left ear to the intensity of the bone-conduction component in the bone-conduction output curve of the left ear; and add a transmission bone-conduction component from the left ear to the right ear to the intensity of the bone-conduction component in the bone-conduction output curve of the right ear.

In some embodiments, the bone-conduction component obtaining module 210 may be further configured to determine the bone-conduction component input-output curve based on the at least one preset parameter of the bone-conduction hearing aid.

In some embodiments, the bone-conduction component obtaining module 210 may be further configured to obtain a sound pressure of a test air-conduction sound and a bone-conduction force level generated by the bone-conduction hearing aid under the action of the test air-conduction sound; and determine the bone-conduction component input-output curve based on the sound pressure of the test air-conduction sound and the bone-conduction force level.

In some embodiments, the system 200 for evaluating the hearing threshold may further include an air-conduction component obtaining module 230 configured to obtain an air-conduction hearing threshold of the user and an air-conduction component input-output curve of the bone-conduction hearing aid, and the processing module 220 may be further configured to determine the hearing threshold of the user after using the bone-conduction hearing aid based on the air-conduction hearing threshold, the air-conduction component input-output curve, the bone-conduction hearing threshold, and the bone-conduction component input-output curve.

In some embodiments, the air-conduction component obtaining module 230 may be further configured to determine the air-conduction component input-output curve based on at least one preset parameter of the bone-conduction hearing aid.

In some embodiments, the air-conduction component obtaining module 230 may be further configured to obtain the sound pressure of the test air-conduction sound and the air-conduction sound pressure generated by the bone-conduction hearing aid under the action of the test air-conduction sound; and determine the air-conduction component input-output curve based on the sound pressure of the test air-conduction sound and the bone-conduction force level.

In some embodiments, the system 200 for evaluating the hearing threshold may further include a perception threshold curve simulation module 240 configured to: obtain a perception threshold curve of the user for a bone-conduction sound and an air conduction sound; and the processing module 220 may further be configured to determine the hearing threshold of the user after using the bone-conduction hearing aid based on the perception threshold curve, the air-conduction hearing threshold, the air-conduction component input-output curve, the bone-conduction hearing threshold, and the bone-conduction component input-output curve, to determine the hearing threshold of the user after using the bone-conduction hearing aid.

In some embodiments, the system 200 for evaluating the hearing threshold may further include a hearing threshold correction module 250 configured to: correct a sound field hearing threshold of the user; correct the hearing threshold of the user after using the bone-conduction hearing aid; and the processing module 220 may be further configured to determine a hearing aid gain based on the corrected sound field hearing threshold of the user and the corrected hearing threshold of the user after using the bone-conduction hearing aid.

It should be noted that the above description of the system and its modules is for descriptive convenience only, and does not limit the present disclosure to the scope of the cited embodiments. It is to be understood that for a person skilled in the art, after understanding the principle of the system, it may be possible to arbitrarily combine individual modules or form a sub-system to be connected to other modules without departing from this principle. For example, the bone-conduction component obtaining module and the processing module may be integrated into one component. As another example, individual modules may share a common storage device, and the individual modules may each have a respective storage device. Morphs such as these are within the scope of protection of the present disclosure.

Figure 3:
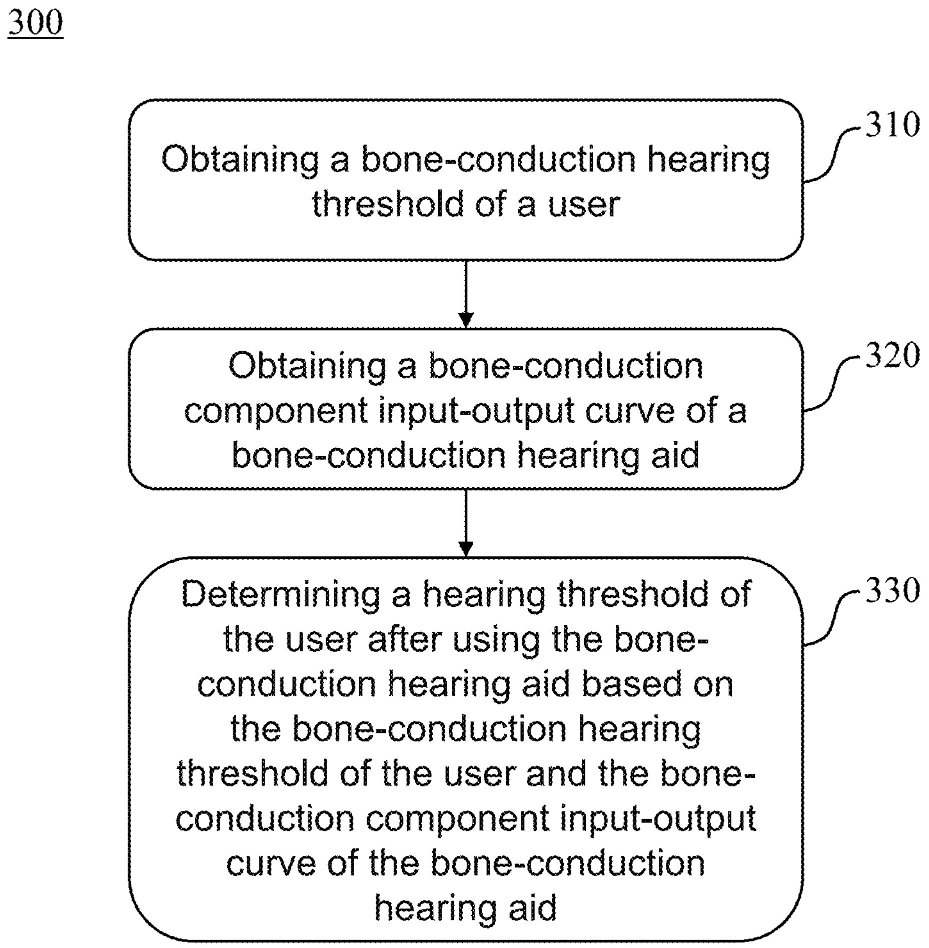
FIG. 3 is a flowchart illustrating an exemplary method for evaluating a hearing threshold of a user after using a bone-conduction hearing aid according to some embodiments of the present disclosure.

FIG. 3 is a flowchart illustrating an exemplary method for evaluating a hearing threshold of a user after using a bone-conduction hearing aid according to some embodiments of the present disclosure. In some embodiments, a process 300 may be performed by the processing device 110. As shown in FIG. 3, the process 300 may include following steps.

In step 310, a bone-conduction hearing threshold of a user is obtained.

In some embodiments, step 310 may be performed by the bone-conduction component obtaining module 210.

The bone-conduction hearing threshold refers to a smallest bone-conduction stimulus intensity that the human ear may just hear. The unit of the bone-conduction stimulus intensity is dBFL. In some embodiments, the bone-conduction hearing threshold may include a bone-conduction hearing threshold of a left ear and a bone-conduction hearing threshold of a right ear. In some embodiments, the bone-conduction hearing threshold of the user may include a bone-conduction masked hearing threshold and a bone-conduction unmasked hearing threshold. The bone-conduction masked hearing threshold may be represented by a BTM, and the bone-conduction unmasked hearing threshold may be represented by a BT. The bone-conduction masked hearing threshold is a bone-conduction hearing threshold of a test ear measured under a condition that masks a non-test ear. The masked hearing threshold reflects the user's true hearing threshold in a single ear. For example, if the test ear is the left ear, the right ear needs to be masked when obtaining the bone-conduction masked hearing threshold for the left ear. Masking the other ear when measuring the user's bone-conduction hearing threshold of the left ear or the hearing threshold of the right ear prevents the non-test ear from hearing a sound that passes at the test ear when measuring the bone-conduction hearing threshold of the test ear. Correspondingly, the bone-conduction unmasked hearing threshold is the bone-conduction hearing threshold of the test ear measured without masking the non-test ear. In some embodiments, the masking of the non-test ear may be accomplished by inputting a noise at the non-test ear.

In some embodiments, the bone-conduction component obtaining module 210 may obtain the bone-conduction hearing threshold of the user based on a hearing report of the user. The hearing report of the user may be provided by a hearing testing organization and/or a hospital and is stored in a storage device, and the bone-conduction component obtaining module 210 may obtain the bone-conduction hearing threshold of the user by communicating with the storage device.

In some embodiments, the bone-conduction component obtaining module 210 may obtain the bone-conduction hearing threshold of the user based on an input from the user. For example, the user inputs the bone-conduction hearing threshold via a terminal device, which the bone-conduction component obtaining module 210 may determine as the bone-conduction hearing threshold of the user.

In some embodiments, the bone-conduction component obtaining module 210 may obtain the bone-conduction hearing threshold of the user in various other feasible ways. For example, the bone-conduction component obtaining module 210 may obtain the bone-conduction hearing threshold of the user through a test or based on historical data, etc.

For illustrative purposes, this paragraph will illustrate, for example, obtaining the bone-conduction hearing threshold of the user through a test. The user wears a bone-conduction vibrator and the user's left and right ears are tested with a test signal at different frequencies (e.g., 250 Hz, 500 Hz, 1000 Hz, 2000 Hz, 4000 Hz, 8000 Hz, etc.). For example, when the frequency of the test signal is 500 Hz, and after masking the user's right ear, the user's left ear is just audible at 40 dB, the user's left ear bone-conduction masked hearing threshold is 40 dB. As another example, when the frequency of the test signal is 500 Hz, and the user's left ear is just audible at 35 dB if the user's right ear is not masked, the user's left ear bone-conduction unmasked hearing threshold is 35 dB. The bone-conduction masked hearing threshold and the bone-conduction unmasked hearing threshold of the right ear may be obtained by referring to the above method.

In step 320, a bone-conduction component input-output curve of a bone-conduction hearing aid is obtained.

In some embodiments, step 320 may be performed by the bone-conduction component obtaining module 210.

The bone-conduction component input-output curve is a relationship curve between a sound pressure level at a microphone of the bone-conduction hearing aid at which a sound is transmitted into and a bone-conduction force level output by the bone-conduction hearing aid.

The bone-conduction force level is used to characterize an intensity of a bone-conduction force output from the bone-conduction hearing aid. The bone-conduction hearing aid has different bone-conduction components at different frequencies, and in some embodiments, obtaining the bone-conduction component input-output curve of the bone-conduction hearing aid may include obtaining outputs of the bone-conduction components at different frequencies. In some embodiments, the bone-conduction component input-output curve may be determined based on at least one preset parameter of the bone-conduction hearing aid, which may be determined via FIG. 4 and its description.

Figure 4:
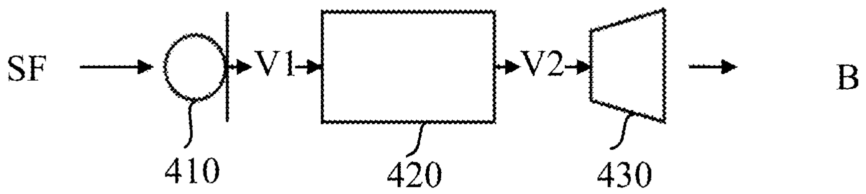
FIG. 4 is a schematic diagram illustrating an exemplary principle of a bone-conduction hearing aid according to some embodiments of the present disclosure.

FIG. 4 is a schematic diagram illustrating an exemplary principle of a bone-conduction hearing aid according to some embodiments of the present disclosure. As shown in FIG. 4, in some embodiments, the bone-conduction hearing aid may include a microphone 410, a signal processing system 420, and a bone-conduction speaker 430.

The microphone 410 is configured to obtain a sound signal from the outside world and convert the sound signal into an electrical signal. The microphone 410 may include, but is not limited to, various types of microphones such as electric (moving coil, aluminum ribbon), condenser (DC polarized), piezoelectric (crystal, ceramic), and electromagnetic.

The signal processing system 420 is configured to perform gain processing on the sound signal. In some embodiments, the signal processing system 420 may include, but is not limited to, an equalizer system, a wide dynamic range compression system, an automatic gain control system, or the like.

The bone-conduction speaker 430 generates a mechanical wave (also known as a bone-conduction sound) based on the electrical signal after the gain processing.

By way of exemplary illustration only, an external sound source of a test air-conduction sound (SF illustrated in FIG. 4) with a specific sound pressure level is captured by the microphone 410, the microphone 410 receives the test air-conduction sound SF and converts the test air-conduction sound SF into an electrical signal V1 and transmits the electrical signal V1 to the signal processing system 420. The signal processing system 420 performs gain processing on the electrical signal V1 to obtain an electrical signal V2, and the bone-conduction speaker 430 generates the bone-conduction sound based on the electrical signal V2, and a bone-conduction force level of the bone-conduction sound may be denoted by B.

In some embodiments, the bone-conduction component obtaining module 210 may determine the bone-conduction component input-output curve based on at least one preset parameter of the bone-conduction hearing aid. It may also be appreciated that by determining the preset parameter of the bone-conduction hearing aid, the bone-conduction component output from the bone-conduction hearing aid may be derived. In some embodiments, the preset parameter may include any one or more of microphone sensitivity (MS), speaker bone-conduction sensitivity (BS), speaker air-conduction sensitivity (AS), hearing aid gain (GAIN), equalizer parameters, wide dynamic range compression parameters, automatic gain control parameters, or the like. In some embodiments, the preset parameter may be obtained by manual input, based on historical data, or the like.

In some embodiments, the bone-conduction component obtaining module 210 may determine a bone-conduction force level B based on the sound pressure level of the test air-conduction sound, a microphone sensitivity MS, a speaker bone-conduction sensitivity BS, and a hearing aid gain GAIN according to a formula (1):

$$B = SF + MS + \text{GAIN} + BS. \quad (1)$$

In some embodiments, the bone-conduction component obtaining module 210 may determine the bone-conduction force level B corresponding to the test air-conduction sound of different sound pressure levels based on the test air-conduction sound of different sound pressure levels, and accordingly determine the bone-conduction component input-output curve. For example, the bone-conduction component obtaining module 210 may determine the bone-conduction force level B based on the sound pressure level of the test air-conduction sound according to the formula (1), and the bone-conduction component obtaining module 210 may determine the bone-conduction component input-output curve by establishing a relationship between a plurality of sets of values of the sound pressure levels of the test air-conduction sound and the bone-conduction force levels.

In some embodiments, the bone-conduction component obtaining module 210 may obtain a sound pressure of the test air-conduction sound and a bone-conduction force level generated by the bone-conduction hearing aid under the action of the test air-conduction sound, and determine the bone-conduction component input-output curve based on the sound pressure of the test air-conduction sound and the bone-conduction force level. For example, the bone-conduction component obtaining module 210 may be based on the industry standard SJZ 9143.2-1987 entitled methods of measurement of the performance characteristics of a hearing aid with an output of a bone vibrator (also referred to as a bone-conduction hearing aid, a bone-conduction vibrator), or the international standard IEC 60118-9 entitled methods of measurement of the performance characteristics of bone-conduction hearing aids to determine the bone-conduction force level of the bone-conduction hearing aid heard by the user under the action of the test air-conduction sound. Further, the bone-conduction component input-output curve is obtained based on a relationship between a plurality of sets of values of sound pressure levels of the test air-conduction sound and the bone-conduction force levels.

The test air-conduction sound refers to an air-conduction sound used for testing. Various parameters of the test air-conduction sound are known. For example, parameters such as an amplitude, a frequency, a sound pressure, a phase, or the like of the test air-conduction sound may be pre-set based on different needs. In some embodiments, the frequency of the test air-conduction sound may be adjusted to obtain bone-conduction component input-output curves corresponding to the bone-conduction hearing aid at different frequencies.

In step 330, a hearing threshold of the user after using the bone-conduction hearing aid is determined based on the bone-conduction hearing threshold of the user and the bone-conduction component input-output curve of the bone-conduction hearing aid.

In some embodiments, step 330 may be performed by the processing module 220.

In some embodiments, the determining the hearing threshold of the user after using the bone-conduction hearing aid based on the bone-conduction hearing threshold of the user and the bone-conduction component input-output curve of the bone-conduction hearing aid may include: determining a bone-conduction hearing level input-output curve based on the bone-conduction component input-output curve of the bone-conduction hearing aid, determining the hearing threshold of the user after using the bone-conduction hearing aid based on the bone-conduction hearing level input-output curve and the bone-conduction hearing threshold.

Figure 5:
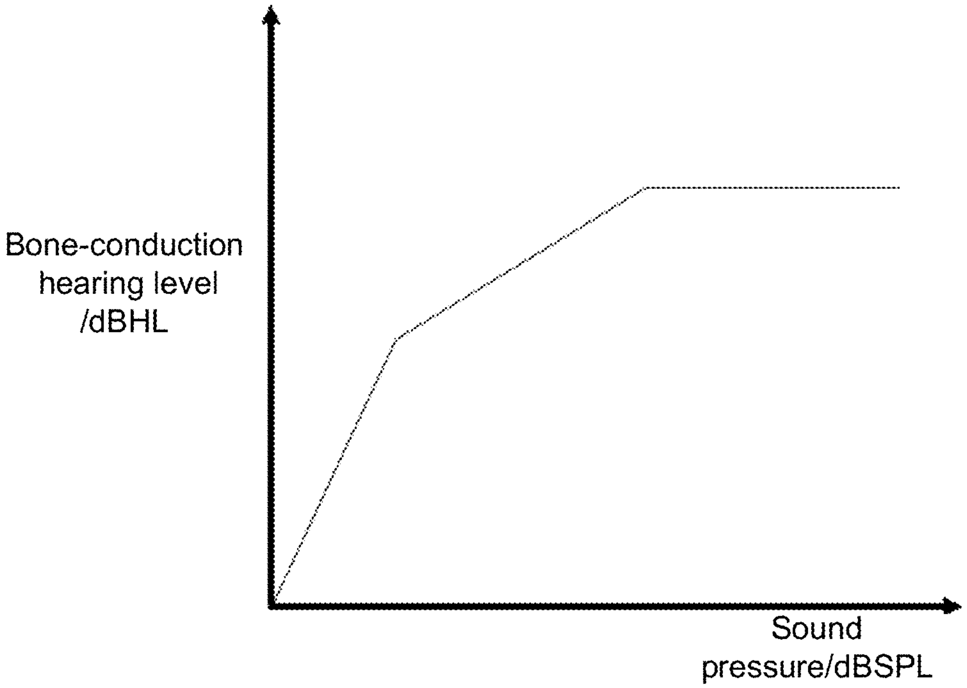
FIG. 5 is a schematic diagram illustrating a relationship curve between a sound pressure at a microphone of a bone-conduction hearing aid at which a sound is transmitted into and a bone-conduction hearing level according to some embodiments of the present disclosure.

In a clinical setting, in order to distinct between hearing-impaired individuals and normal-hearing individuals, it is often necessary to convert the bone-conduction force level to the bone-conduction hearing level. In some embodiments, determining the bone-conduction hearing level input-output curve based on the bone-conduction component input-output curve of the bone-conduction hearing aid may include: determining the bone-conduction hearing level input-output curve based on the bone-conduction component input-output curve of the bone-conduction hearing aid and a baseline equivalent threshold force level. The bone-conduction hearing level input-output curve is a relationship curve between the sound pressure level at the microphone of the bone-conduction hearing aid at which a sound source is transmitted into and the bone-conduction hearing level output from the bone-conduction hearing aid. In some embodiments, determining the bone-conduction hearing level input-output curve based on the bone-conduction component input-output curve of the bone-conduction hearing aid and a baseline equivalent threshold force level may include: translating the bone-conduction component input-output curve along a negative direction of a longitudinal axis by a particular unit, the particular unit being the baseline equivalent threshold force level. In other words, the bone-conduction hearing level input-output curve may be obtained by subtracting the baseline equivalent threshold force level from longitudinal coordinates (the bone-conduction force level) in the bone-conduction component input-output curve. The baseline equivalent threshold force level is a mean value of a smallest vibration force level that can be heard by a person with normal hearing. Correspondingly, the bone-conduction hearing level is also used to characterize an intensity of a bone-conduction force output from the bone-conduction hearing aid, except that the bone-conduction hearing level is a difference between the bone-conduction force level and the baseline equivalent threshold force level. In some embodiments, the baseline equivalent threshold force level may be a constant value, and the baseline equivalent threshold force level may be pre-set and stored in the bone-conduction component obtaining module 210. In some embodiments, the bone-conduction hearing level may be a positive value, a negative value, or 0. FIG. 5 is a schematic diagram illustrating a two-dimensional relationship between a sound pressure at a microphone of a bone-conduction hearing aid at which a sound of a specific frequency is transmitted into and a bone-conduction hearing level. Horizontal axis in a coordinate system of FIG. 5 is the sound pressure (dBSPL) at the microphone of the bone-conduction hearing aid at which the sound of a specific frequency is transmitted into, and the vertical axis is the bone-conduction hearing level (dBHL) output from the bone-conduction hearing aid. It is to be noted that FIG. 5 is just an example showing a bone-conduction hearing level input-output curve corresponding to a bone-conduction hearing aid at a certain frequency, and the bone-conduction hearing aid has different bone-conduction hearing level input-output curves at different frequencies. In some embodiments, by adjusting the frequency of the test air-conduction sound, the bone-conduction hearing level input-output curves corresponding to the bone-conduction hearing aid at different frequencies may be obtained, and then the bone-conduction hearing level input-output curves of the bone-conduction hearing aid at different frequencies may be obtained based on the step 330.

In some embodiments, determining the hearing threshold of the user after using the bone-conduction hearing aid based on the bone-conduction hearing level input-output curve and the bone-conduction hearing threshold may include: determining the hearing threshold of the user after using the bone-conduction hearing aid based on the user's bone-conduction hearing thresholds at different frequencies and the bone-conduction hearing level input-output curves corresponding to different frequencies. In some embodiments, the user has corresponding bone-conduction hearing thresholds at different frequencies (250 Hz, 500 Hz, 1000 Hz, 2000 Hz, 4000 Hz, 8000 Hz), e.g., the user's bone-conduction hearing thresholds at frequencies of 250 Hz, 500 Hz, 1000 Hz, and 2000 Hz are M1, M2, M3, and M4, respectively. Correspondingly, the bone-conduction hearing aid at different frequencies has different bone-conduction hearing level input-output curves. By way of example only, the user's bone-conduction hearing threshold at a particular frequency and the bone-conduction hearing level input-output curve of the bone-conduction hearing aid at the particular frequency are illustrated (e.g., a bone-conduction hearing level input-output curve illustrated in FIG. 5). When the bone-conduction hearing level input-output curve illustrated in FIG. 5 is lower than a specific sound pressure, the bone-conduction hearing level and the sound pressure of the test air-conduction sound has a linear relationship (e.g., a linear function image illustrated in FIG. 5), and through the linear relationship and the bone-conduction hearing threshold at the particular frequency of the user, a corresponding air-conduction sound pressure level may be obtained. Specifically, here the bone-conduction hearing threshold of the user at the particular frequency is used as a variable in the linear relationship, which reflects the bone-conduction hearing level that the user happens to be able to hear. Further, in order to facilitate the distinction between a hearing-impaired person and a hearing-normal person, it is often necessary to convert the air-conduction sound pressure level to an air-conduction hearing level. In some embodiments, the air-conduction hearing level is a difference between the air-conduction sound pressure level and a baseline equivalent threshold sound pressure level. The baseline equivalent threshold sound pressure level represents a mean value of a minimum air-conduction sound intensity (a sound pressure level) that can be heard by a person with normal hearing. The air-conduction hearing level obtained by conversion is a hearing threshold at the specific frequency of the user after using the bone-conduction hearing aid. Further, obtaining the hearing thresholds of the user after using the bone-conduction hearing aid at different frequencies may be determined based on the bone-conduction hearing thresholds of the user at different frequencies and the bone-conduction hearing level input-output curves of the bone-conduction hearing aid at different frequencies.

In the embodiments of the present disclosure, during determining the hearing threshold of the user after using the bone-conduction hearing aid, by utilizing the bone-conduction hearing threshold of the user and the bone-conduction component input-output curve of the bone-conduction hearing aid, a store and a remote service provider that do not have the testing conditions can conveniently determine the hearing threshold of the user after using the bone-conduction hearing aid without strict testing environment and testing equipment, which improves the convenience and speed of determining the hearing threshold of the user after using the bone-conduction hearing aid.

It should be noted that the above-described process 300 may determine the hearing threshold of the user after wearing a single bone-conduction hearing aid in a single ear. For example, in a scenario in which one of the user's left ear and right ear wears the bone-conduction hearing aid and the other ear does not wear the bone-conduction hearing aid, the process 300 is configured to determine the hearing threshold of the user's left ear after wearing the bone-conduction hearing aid, and the hearing threshold of the right ear after wearing the bone-conduction hearing aid, respectively. In some embodiments, the bone-conduction hearing threshold used in the process of determining the hearing threshold of the user after wearing a single hearing aid in a single ear is a bone-conduction masked hearing threshold.

Since a force generated by the bone-conduction hearing aid propagates through bones, when the user has bone-conduction vibrators at both ears, the user's left ear can not only receive a bone-conduction sound from the bone-conduction vibrator at the left ear, but also receive a bone-conduction sound from the bone-conduction vibrator at the right ear. Similarly, the user's right ear can not only receive the bone-conduction sound output by the bone-conduction vibrator at the right ear, but also receive the bone-conduction sound output by the bone-conduction vibrator at the left ear. Based on the above problem, in order to improve the accuracy of the hearing threshold of the user after wearing the bone-conduction hearing aid, in some embodiments, there is a need to correct a bone-conduction component heard at the user's left ear and a bone-conduction component heard at the user's right ear. Specifics regarding the correction of the bone-conduction component can be found in FIG. 6 and FIG. 7, and their related contents.

Figure 6:
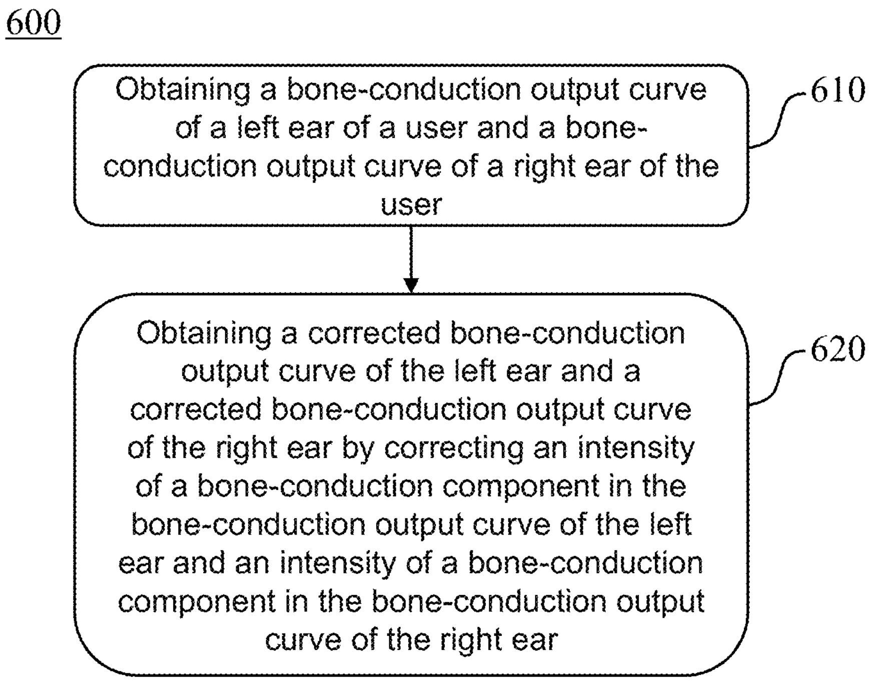
FIG. 6 is a flowchart illustrating an exemplary process for obtaining a bone-conduction component input-output curve according to some embodiments of the present disclosure.

FIG. 6 is a flowchart illustrating an exemplary process for obtaining a bone-conduction component input-output curve according to some embodiments of the present disclosure. In some embodiments, a process 600 may be performed by the processing device 110. As shown in FIG. 6, the process 600 may include following steps.

In step 610, a bone-conduction output curve of a left ear of a user and a bone-conduction output curve of a right ear of the user are obtained.

In some embodiments, the step 610 may be performed by the bone-conduction component obtaining module 210.

The bone-conduction output curve of the user's left ear is a bone-conduction component input-output curve of a bone-conduction component received at the user's left ear, and the bone-conduction output curve of the user's right ear is a bone-conduction component input-output curve of a bone-conduction component received at the user's right ear. More description regarding the bone-conduction output curve of the user's left ear and the bone-conduction output curve of the user's right ear may refer to the relevant contents of FIG. 3 and FIG. 4.

In step 620, a corrected bone-conduction output curve of the left ear and a corrected bone-conduction output curve of the right ear are obtained by correcting an intensity of a bone-conduction component in the bone-conduction output curve of the left ear and an intensity of a bone-conduction component in the bone-conduction output curve of the right ear.

In some embodiments, the step 620 may be performed by the bone-conduction component transmission correction module 221 in the processing module 220.

The transmission bone-conduction component refers to a bone-conduction force level on one ear on one side acted by a bone-conduction force level generated by a bone-conduction vibrator of the other ear on the other side. In some embodiments, the transmission bone-conduction component may be approximated as bone-conduction components at the contralateral ear. For example, the transmission bone-conduction component from the right ear to the left ear may be a bone-conduction force level at the right ear. Since the bone-conduction force level propagating through a head may undergo loss, that is, the bone-conduction force level may attenuate as it propagates through the head, which is known as intracranial attenuation. Therefore, when calculating the transmission bone-conduction component, an attenuation value of a bone-conduction component of the contralateral ear passing through the head needs to be taken into account. Specific considerations of the intracranial attenuation can be found in the following section.

In some embodiments, the intensity of the transmission bone-conduction component from the right ear to the left ear is related to an attenuation value and a conduction time when a bone-conduction sound is conducted from the right ear to the left ear. The attenuation value refers to a value of loss of the intensity of the transmission bone-conduction component as it is conducted from one side of the head to the other side of the head. For example, if an intensity of the transmission bone-conduction component from the right ear to the left ear is a1, and an intensity of the transmission bone-conduction component after being conducted from the right ear through the head to the left ear is a2, then the attenuation value is (a1-a2). The conduction time refers to a time for the transmission bone-conduction component to be conducted from one side of the head to the other side of the head.

In some embodiments, the transmission bone-conduction component from the right ear to the left ear may be determined through a formula (2):

$$BSRL = BSR - TA, \tag{2}$$

where BSRL denotes the transmission bone-conduction component from the right ear to the left ear, BSR denotes a bone-conduction hearing level at the right ear, and TA denotes the attenuation value of the intensity of the transmission bone-conduction component, which may be a preset value.

In some embodiments, the transmission bone-conduction component from the right ear to the left ear may be added to the intensity of the bone-conduction component in the bone-conduction output curve of the left ear, which may be expressed by a formula (3):

$$BL2 = 20 * \log 10^{\left(10^{\frac{BL1}{20}} + 10^{\frac{BSRL}{20}} * e^{\wedge}(-iw\Delta t)\right)}, \tag{3}$$

where BL2 denotes the intensity of the bone-conduction component of the left ear after correction, BL1 denotes the intensity of the bone-conduction component of the left ear before correction, e and i denote constants, w denotes an angle frequency, and Δt denotes the transmission time.

In some embodiments, correcting the intensity of the bone-conduction component in the bone-conduction output curve of the right ear includes: adding the transmission bone-conduction component from the left ear to the right ear to the intensity of the bone-conduction component in the bone-conduction output curve of the right ear. In some embodiments, the intensity of the transmission bone-conduction component from the left ear to the right ear is related to the attenuation value and the transmission time of the bone-conduction sound as the bone-conduction sound is conducted from the left ear to the right ear.

In some embodiments, the transmission bone-conduction component from the left ear to the right ear may be determined through a formula (4):

$$BSLR = BSL - TA, \tag{4}$$

where, BSLR denotes the transmission bone-conduction component from the left ear to the right ear, BSL denotes a bone-conduction hearing level at the left ear, and TA denotes the attenuation value of the intensity of the transmission bone-conduction component, which may be a preset value.

In some embodiments, the transmission bone-conduction component from the left ear to the right ear may be added to the intensity of the bone-conduction component in the bone-conduction output curve of the right ear, which may be expressed by a formula (5):

$$BR2 = 20 * \log 10^{\left(10^{\frac{BR1}{20}} + 10^{\frac{BSLR}{20}} * e^{\wedge}(-iw\Delta t)\right)}, \tag{5}$$

where BR2 denotes the intensity of the bone-conduction component of the right ear after correction, BR1 denotes the intensity of the bone-conduction component of the right ear before correction, e and i denote constants, w denotes the angle frequency, and Δt denotes the transmission time.

Some embodiments of the present disclosure can make the bone-conduction output curve of the left ear and the bone-conduction output curve of the right ear more accurate by correcting the intensity of the bone-conduction component in the bone-conduction output curve of the left ear and the intensity of the bone-conduction component in the bone-conduction output curve of the right ear.

Figure 7:
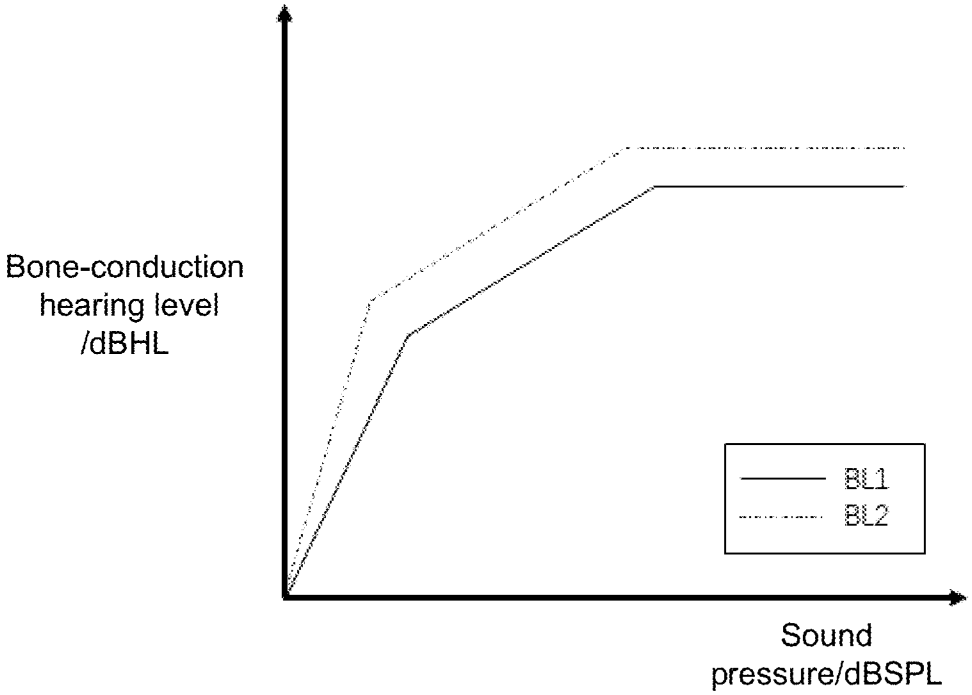
FIG. 7 is a schematic diagram illustrating intensities of a bone-conduction component in a bone-conduction output curve of a left ear with and without correction according to some embodiments of the present disclosure.

FIG. 7 is a schematic diagram illustrating intensities of a bone-conduction component in a bone-conduction output curve of a left ear with and without correction according to some embodiments of the present disclosure. Taking the correction of the intensity of the bone-conduction component of the left ear as an example for illustration, in FIG. 7, a solid line BL1 indicates the intensity of the bone-conduction component of the left ear before correction, and a dashed line BL2 indicates the intensity of the bone-conduction component of the left ear after correction, the intensity BL1 of the bone-conduction component of the left ear is corrected by the above manner. It can be seen from the figure that BL2 is higher than BL1, and the curve BL2 takes into account the transmission bone-conduction component, which makes the corrected bone-conduction output curve more accurate.

Some embodiments of the present disclosure consider an attenuation value and a conduction time of transcranial conduction related to the intensity of the transmission bone-conduction component while correcting the bone-conduction output curve, which allows for a more accurate determination of the transmission bone-conduction component and improves the accuracy of corresponding bone-conduction output curves at both ears.

In some embodiments, a bone-conduction force level input-output curve of the left ear may be determined based on the corrected bone-conduction output curve of the left ear, and a bone-conduction force level input-output curve of the right ear may be determined based on the corrected bone-conduction output curve of the right ear. Then a bone-conduction hearing level input-output curve of the left ear may be determined based on the bone-conduction force level of the left ear and a baseline equivalent threshold force level, and a bone-conduction hearing level input-output curve received of the right ear may be determined based on the bone-conduction force level of the right ear and the baseline equivalent threshold force level. For example, the bone-conduction hearing level input-output curve of the left ear may be determined by calculating a difference between the bone-conduction force level of the left ear and the baseline equivalent threshold force level, and the bone-conduction hearing level input-output curve of the right ear may be determined by calculating a difference between the bone-conduction force level of the right ear and the baseline equivalent threshold force level. Then, based on a bone-conduction hearing threshold of the user (e.g., a bone-conduction hearing threshold of the left ear and a bone-conduction hearing threshold of the right ear), the bone-conduction hearing level input-output curve of the left ear, and the bone-conduction hearing level input-output curve of the right ear, the hearing threshold of the user after using a bone-conduction hearing aid is determined. More description of determining the bone-conduction hearing threshold of the user after using the bone-conduction hearing aid may be found in FIG. 3 and its related description.

The bone-conduction hearing aid may include a housing, and the housing may be configured to accommodate a microphone, a speaker (a bone-conduction vibrator), etc. When the user wears the bone-conduction hearing aid, the housing may be located in a facial area near the user's ear (e.g., in front of, above, below, or behind the ear). When vibrating, the bone-conduction vibrator may drive the housing and air inside the housing to vibrate, and the vibration of the housing may cause the air outside to vibrate, thereby generating an air-conduction sound. The air-conduction sound may be transmitted to the user's ear as a gain of the bone-conduction hearing aid, thereby affecting the accuracy of predicting the hearing threshold of the user after using the bone-conduction hearing aid. Based on the above-described problem, the method for evaluating the hearing threshold of the user after using the bone-conduction hearing aid may further include determining the hearing threshold of the user after using the bone-conduction hearing aid based on an air-conduction hearing threshold, an air-conduction component input-output curve, a bone-conduction hearing threshold, and a bone-conduction component input-output curve. For details of the air-conduction hearing threshold and the air-conduction component input-output curve, please refer to FIG. 8 to FIG. 10 and their related descriptions.

Figure 8:
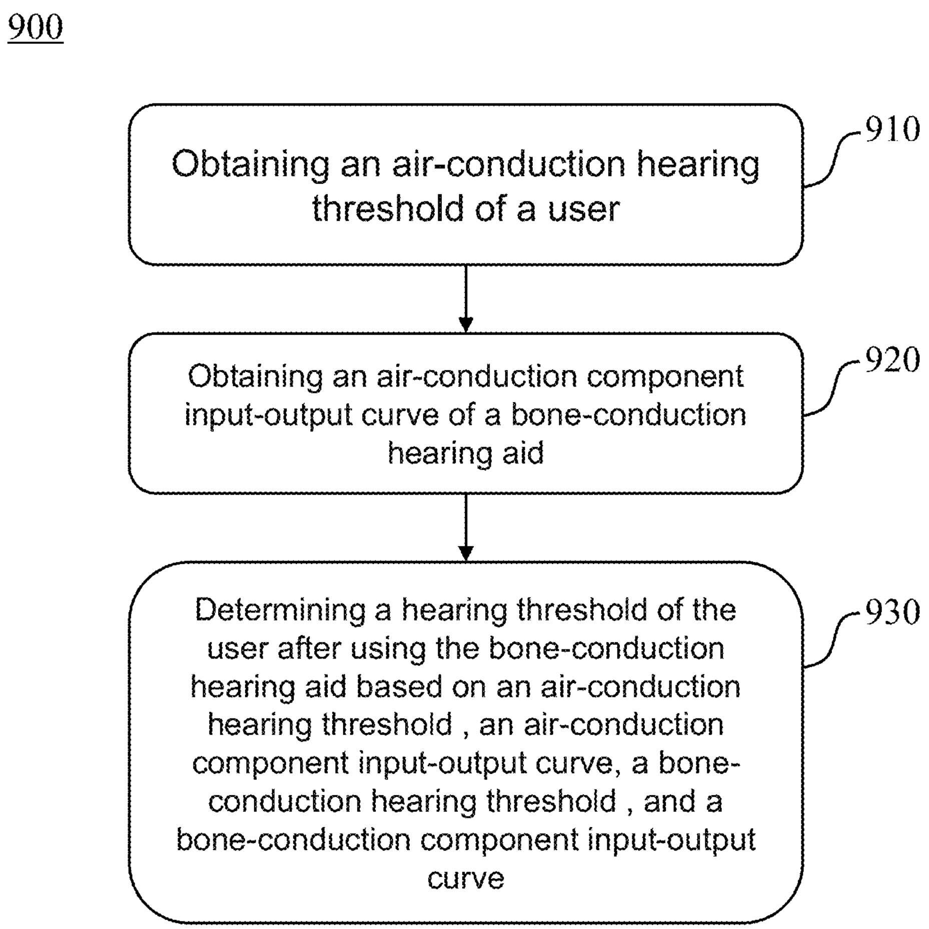
FIG. 8 is a flowchart illustrating an exemplary method for evaluating a hearing threshold of a user after using a bone-conduction hearing aid according to some embodiments of the present disclosure.

FIG. 8 is a flowchart illustrating an exemplary method for evaluating a hearing threshold of a user after using a bone-conduction hearing aid according to some embodiments of the present disclosure. In some embodiments, a process 900 may be performed by the processing device 110. As shown in FIG. 8, the process 900 may include following steps.

In step 910, an air-conduction hearing threshold of the user is obtained.

In some embodiments, the step 910 may be performed by the air-conduction component obtaining module 230.

The air-conduction hearing threshold refers to a smallest air-conduction stimulus intensity that the human ear can just hear. The unit of the air-conduction stimulus intensity is dBSPL. The air-conduction hearing threshold may be expressed in AT. In some embodiments, the air-conduction hearing threshold may include an air-conduction hearing threshold of a left ear and an air-conduction hearing threshold of a right ear. The air-conduction hearing threshold of the left ear may be represented in ATL, and the air-conduction hearing threshold of the right ear may be represented in ATR.

In some embodiments, the air-conduction hearing threshold of the user may be obtained based on a hearing report of the user. The hearing report of the user may be provided by a hearing testing facility and/or a hospital and is stored in a storage device, and the air-conduction component obtaining module 230 may be in communication with the storage device to obtain the air-conduction hearing threshold of the user. In some embodiments, the air-conduction hearing threshold of the user may be obtained based on an input from the user. For example, the user inputs the air-conduction hearing threshold via a terminal device. In some embodiments, the air-conduction hearing threshold of the user may be obtained in various other feasible ways. For example, the air-conduction hearing threshold of the user is obtained through testing, based on historical data, etc.

For illustrative purposes, this paragraph will illustrate, for example, obtaining the user's air-conduction hearing threshold through testing. The user wears a bone-conduction vibrator and the user's left and right ears are tested with a test signal at different frequencies (e.g., 250 Hz, 500 Hz, 1000 Hz, 2000 Hz, 4000 Hz, 8000 Hz, etc.). For example, when the frequency of the test signal is 500 Hz and the user's left ear is just audible at 40 dB, the air-conduction hearing threshold of left ear of the user is 40 dB. As another example, when the frequency of the test signal is 500 Hz, and the user's right ear is just audible at 35 dB, the air-conduction hearing threshold of right ear of the user is 35 dB.

In step 920, an air-conduction component input-output curve of the bone-conduction hearing aid is obtained. In some embodiments, the step 920 may be performed by the air-conduction component obtaining module 230.

The air-conduction component input-output curve refers to a curve relationship between a sound pressure (which may be expressed as SF) at a microphone of the bone-conduction hearing aid at which a sound is transmitted into and an air-conduction hearing level output from the bone-conduction hearing aid.

Figure 10:
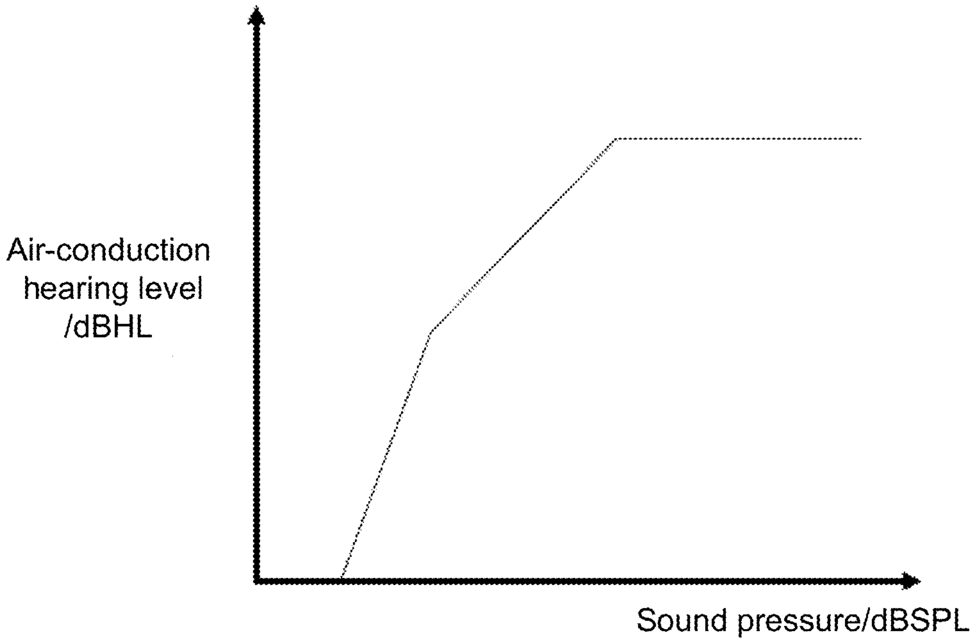
FIG. 10 is a diagram illustrating a relationship curve between a sound pressure at a microphone of a bone-conduction hearing aid at which a sound is transmitted into and an air-conduction hearing level according to some embodiments of the present disclosure.

FIG. 10 is a diagram illustrating a relationship curve between a sound pressure at a microphone of a bone-conduction hearing aid at which a sound of a specific frequency is transmitted into and an air-conduction hearing level. A horizontal axis in a coordinate system of FIG. 10 is the sound pressure (dBSPL) at the microphone of the bone-conduction hearing aid at which the sound is transmitted into, and a vertical axis is the air-conduction hearing level (dBHL) output from the bone-conduction hearing aid.

Figure 9:
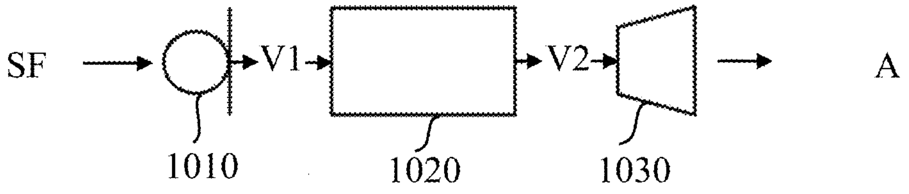
FIG. 9 is a schematic diagram illustrating an exemplary principle of a bone-conduction hearing aid according to some embodiments of the present disclosure.

FIG. 9 is a schematic diagram illustrating an exemplary principle of a bone-conduction hearing aid according to some embodiments of the present disclosure. As shown in FIG. 9, in some embodiments, a bone-conduction hearing aid may include a microphone 1010, a signal processing system 1020, and a bone-conduction speaker 1030.

The microphone 1010, the signal processing system 1020, and the bone-conduction speaker 1030 are the same as or similar to the microphone 410, the signal processing system 420, and the bone-conduction speaker 430 of FIG. 4, and will not be described herein.

By way of exemplary illustration only, an external sound source of a test air-conduction sound (SF illustrated in FIG. 10) with a specific sound pressure level is captured by the microphone 1010, the microphone 1010 receives the test air-conduction sound SF and converts the test air-conduction sound SF into an electrical signal V1, then the electrical signal V1 is passed to the signal processing system 1020. The signal processing system 1020 performs gain processing on the electrical signal V1 to obtain an electrical signal V2, and the bone-conduction speaker 1030 generates an air-conduction sound based on the electrical signal V2, and an air-conduction force level of the air-conduction sound may be denoted by A.

In some embodiments, an air-conduction component input-output curve may be determined based on at least one preset parameter of the bone-conduction hearing aid. It will also be appreciated that by determining the preset parameter of the bone-conduction hearing aid, an air-conduction component output from the bone-conduction hearing aid may be derived. In some embodiments, the preset parameter may include any one or more of microphone sensitivity (MS), speaker bone-conduction sensitivity (BS), speaker air conduction sensitivity (AS) hearing aid gain (GAIN), equalizer parameters, wide dynamic range compression parameters, automatic gain control parameters, or the like. In some embodiments, the preset parameter may be obtained by manual input, based on historical data, or the like.

In some embodiments, an air-conduction sound pressure level A may be determined based on the sound pressure level SF of the test air-conduction sound, a microphone sensitivity MS, a speaker air-conduction sensitivity AS, and a hearing aid gain GAIN according to formula (6):

$$A = SF + MS + GAIN + AS. \tag{6}$$

In some embodiments, the air-conduction component input-output curve may be determined based on the sound pressure level SF of the test air-conduction sound, the air-conduction sound pressure level A, and a baseline equivalent threshold sound pressure level. For example, the air-conduction sound pressure level A may be determined based on the sound pressure SF of the test air-conduction sound through the formula (6). Specifically, an air-conduction hearing level is determined based on the air-conduction sound pressure level A and the baseline equivalent threshold sound pressure level. For example, the air-conduction hearing level is determined by calculating a difference between the air-conduction sound pressure level A and the baseline equivalent threshold sound pressure level. In some embodiments, determining the air-conduction component input-output curve may further include establishing a relationship between a plurality of sets of values of the sound pressures of the test air-conduction sound and the air-conduction hearing levels, thereby determining the air-conduction component input-output curve.

Some embodiments of the present disclosure are based on the sound pressure of the test air-conduction sound and the preset parameter of the bone-conduction hearing aid, which allows for determining the air-conduction component input-output curve. Set up in this way, air-conduction hearing levels corresponding to sound pressures of different test air-conduction sounds may be obtained without the need for actual testing, improving the speed and expediency of determining the air-conduction component input-output curve.

In some embodiments, the air-conduction component obtaining module 230 may obtain the sound pressure of the test air-conduction sound and an air-conduction sound pressure generated by the bone-conduction hearing aid under the action of the test air-conduction sound, and determine the air-conduction component input-output curve based on the sound pressure of the test air-conduction sound and the air-conduction hearing level. For example, the air-conduction component obtaining module 230 develops a test manner with reference to GB/T 25102.100-2010 and measures the air-conduction sound pressure level heard by the user generated by the bone-conduction hearing aid under the test air-conduction sound that is under the premise of isolating the influence of a sound field, and then obtain the air-conduction hearing level of the bone-conduction hearing aid under the effect of the air-conduction sound based on the air-conduction sound pressure level and the baseline equivalent threshold sound pressure level. For example, the air-conduction component obtaining module 230 calculates a difference between the measured air-conduction sound pressure level and the baseline equivalent threshold force level to obtain the air-conduction hearing level under the action of the test air-conduction sound. Further, the air-conduction component obtaining module 230 establishes a relationship between the sound pressure level of the test air-conduction sound and the air-conduction hearing level based on a plurality of values of sound pressure levels of the test air-conduction sound and air-conduction hearing levels to obtain the air-conduction component input-output curve.

When the user wears the bone-conduction hearing aid, the bone-conduction vibrator is located near the user's ear and doesn't block the user's ear canal, in which case a sound generated by an external sound field may be received by the user's ear, and therefore the external sound field has a greater impact on determining the hearing threshold of the user after using the bone-conduction hearing aid. The influence of the external sound field therefore needs to be considered.

In some embodiments, a corrected air-conduction component of the left ear may be determined according to a formula (7):

$$AL2 = 20 * \log 10^{\left(10^{\frac{AL1}{20}} * e \wedge (-iw\Delta t1) + 10^{\frac{SF}{20}}\right)}, \tag{7}$$

where AL2 denotes the corrected air-conduction component of the left ear, AL1 denotes an air-conduction component of the left ear before correction, e and i denote constants, w denotes the angle frequency, and Δt1 denotes a signal processing time.

In some embodiments, a corrected air-conduction component of the right ear may be determined via a formula (8):

$$AR2 = 20 * \log 10^{\left(10^{\frac{AR1}{20}} * e\hat{}(-iw\Delta t1) + 10^{\frac{SF}{20}}\right)} \tag{8}$$

where AR2 denotes the corrected air-conduction component of the right ear, AR1 denotes the air-conduction component of the right ear before correction, e and i denote constants, w denotes the angle frequency, and Δt1 denotes the signal processing time.

Figure 11:
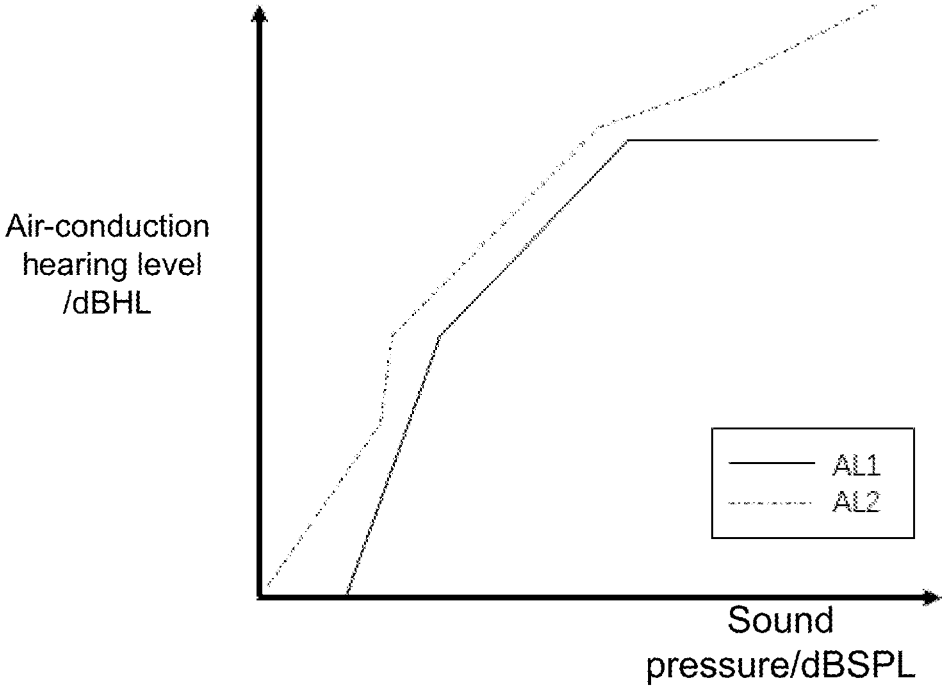
FIG. 11 is a diagram illustrating of intensities of an air-conduction component in an air-conduction output curve of a left ear with and without correction according to some embodiments of the present disclosure.

FIG. 11 is a schematic diagram illustrating intensities of an air-conduction component in an air-conduction output curve of a left ear with and without correction according to some embodiments of the present disclosure. Taking the correction of the intensity of the air-conduction component of the left ear as an example for illustration, in FIG. 11, a solid line AL1 indicates an intensity of the air-conduction component of the left ear before correction, and a dashed line AL2 indicates an intensity of the air-conduction component of the left ear after correction, the intensity AL1 of the air-conduction component of the left ear is corrected by the above manner. It can be seen from the figure that AL2 is higher than AL1, which makes the corrected air-conduction output curve more accurate.

In step 930, a hearing threshold of the user after using the bone-conduction hearing aid is determined based on the air-conduction hearing threshold, the air-conduction component input-output curve, the bone-conduction hearing threshold, and the bone-conduction component input-output curve.

In some embodiments, the step 930 may be performed by the processing module 220.

Whether it is a bone-conduction sound or an air-conduction sound, it eventually reaches the user's cochlea, triggering a vibration of a base membrane of the user's ear and thereby triggering an auditory nerve impulse. When both the bone-conduction sound and the air-conduction sound are present (i.e., a bone-conduction component and an air-conduction component are present at the same time), the sounds are superimposed at the cochlea. There will be a situation where the bone-conduction component and the air-conduction component are both lower than a bone-conduction hearing threshold and an air-conduction hearing threshold of the user, but the bone-conduction sound and the air-conduction component superimposed on each other can be heard by the user, which affects the accuracy of the predicting the hearing threshold of the user after using the bone-conduction hearing aid. Based on the above problem, in order to correct the hearing threshold of the user after using the bone-conduction hearing aid, in some embodiments, determining the hearing threshold of the user after using the bone-conduction hearing aid based on the air-conduction hearing threshold, the air-conduction component input-output curve, the bone-conduction hearing threshold, and the bone-conduction component input-output curve may include obtaining a perception threshold curve of the user for the bone-conduction sound and the air-conduction sound, and determining the hearing threshold of the user after using the bone-conduction hearing aid based on the perception threshold curve and the air-conduction hearing threshold, the air conduction component input-output curve, the bone-conduction hearing threshold, and the bone-conduction component input-output curve. More description regarding obtaining the perception threshold curve of the user for the bone-conduction sound and the air-conduction sound and determining the hearing threshold of the user after using the bone-conduction hearing aid based on the perception threshold curve, the air-conduction hearing threshold, the air-conduction component input-output curve, the bone-conduction hearing threshold, and the bone-conduction component input-output curve can refer to FIG. 12 and its related descriptions.

In some embodiments of the present disclosure, the hearing threshold of the user after using the bone-conduction hearing aid is determined based on the air-conduction hearing threshold, the air-conduction component input-output curve, the bone-conduction hearing threshold, the bone-conduction component input-output curve, which fully consider the influence of factors such as a transmission bone-conduction component, the external sound field, the superposition effect of the bone-conduction sound and the air-conduction sound, thereby improving the accuracy of determining the hearing threshold of the user after using the bone-conduction hearing aid.

Figure 12:
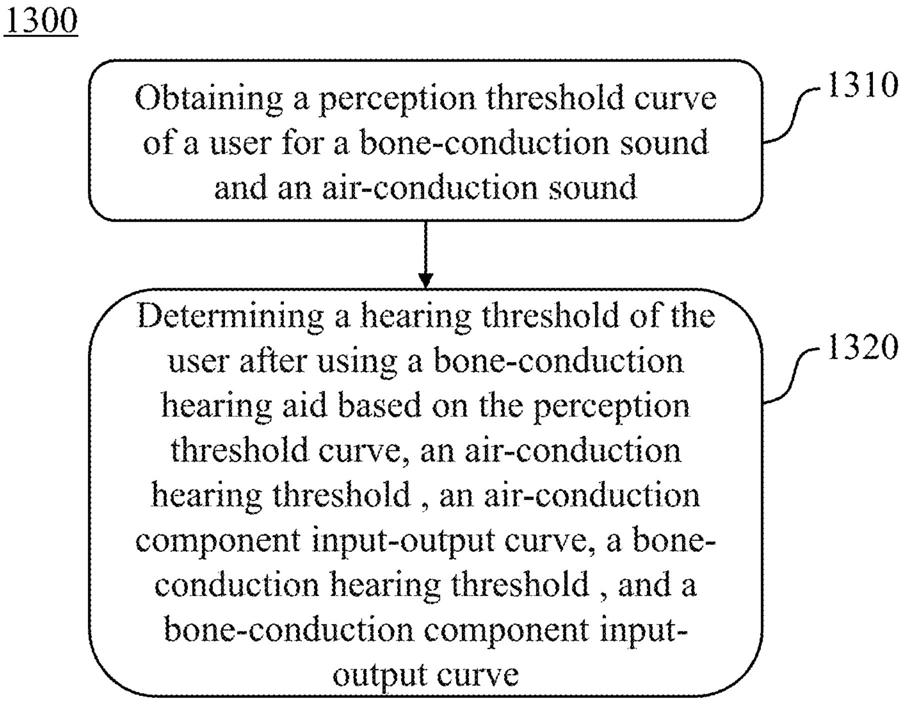
FIG. 12 is a flowchart illustrating an exemplary method for evaluating a hearing threshold of a user after using a bone-conduction hearing aid according to some embodiments of the present disclosure.

FIG. 12 is a flowchart illustrating an exemplary method for evaluating a hearing threshold of a user after using a bone-conduction hearing aid according to some embodiments of the present disclosure. In some embodiments, a process 1300 may be performed by the processing device 110. As shown in FIG. 12, the process 1300 may include following steps.

In step 1310, a perception threshold curve of a user for a bone-conduction sound and an air-conduction sound is obtained. In some embodiments, the step 1310 may be performed by the perception threshold curve simulation module 240.

The perception threshold refers to a minimum stimulus intensity at which the bone-conduction sound and the air-conduction sound simultaneously at a cochlea of the user may elicit auditory perception. For example, when the air-conduction sound and the bone-conduction sound are present at the same time, both sounds may cause the minimum stimulus intensity of auditory perception at the cochlea of the user. Further, the perception threshold curve refers to a curve formed based on the perception threshold. The perception threshold curve may reflect an intensity of a sound that elicits an auditory perception of a human.

In some embodiments, the perception threshold curve of the user for the bone-conduction sound and the air-conduction sound may be obtained according to a formula (9):

$$STL = 20 * \log 10\left(10\hat{}\frac{(BL2 - BTM)}{20} + 10\hat{}\frac{(AL2 - AT)}{20} * e\hat{}(-iw\Delta t2)\right), \tag{9}$$

where STL denotes a perception threshold of a left ear, and Δt2 denotes a time difference of an air-conduction component relative to a bone-conduction component. As can be seen, the perception threshold curve is related to a bone-conduction hearing threshold, an air-conduction hearing threshold, and the time difference of the air-conduction component relative to the bone-conduction component.

Figure 13:
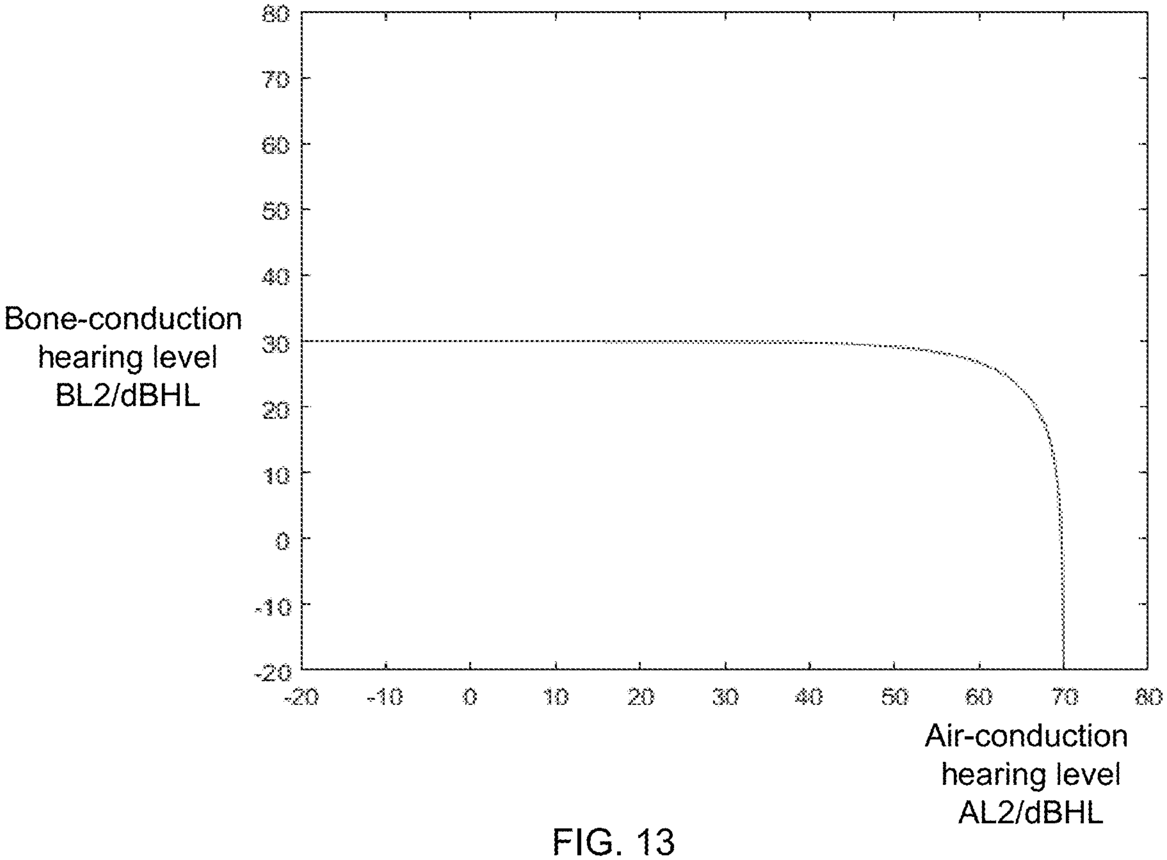
FIG. 13 is a schematic diagram illustrating an exemplary perception threshold curve according to some embodiments of the present disclosure.

FIG. 13 is a schematic diagram illustrating an exemplary perception threshold curve according to some embodiments of the present disclosure. Taking the left ear as an example, FIG. 13 illustrates a perception threshold curve when Δt2 is 0, BTM is 30 dBHL, and AT is 70 dBHL. A horizontal axis of the coordinate system of FIG. 13 is an air-conduction hearing level AL2 (dBHL), and a vertical axis is a bone-conduction hearing level BL2 (dBHL), and points on or off the curve may represent stimuli that can elicit auditory perception of humans. For example, in FIG. 13, an intersection of the perception threshold curve with the horizontal axis is 70 dBHL, which indicates that an air-conduction hearing threshold of the left ear is 70 dBHL, and an intersection of the perception threshold curve with the vertical axis is 30 dBHL, which indicates that a bone-conduction hearing threshold of the left ear is 30 dBHL. As another example, if an air-conduction hearing level AL2 of 70 dBHL and a bone-conduction hearing level BL2 of 40 dBHL are present at the same time, the simultaneous action of an air-conduction component and a bone-conduction component described above (i.e., superposition) can elicit auditory perception of humans.

It should be noted that the perception threshold curve shown in FIG. 13 takes into account the effect of the superposition of the air-conduction component and the bone-conduction component, i.e., both the bone-conduction component and air-conduction component are lower than the bone-conduction hearing threshold and the air-conduction hearing threshold of the user, but the bone-conduction component and the air-conduction component superimposed and can be heard by the user. Therefore, the perception threshold curve is not a rectangle, i.e., an upper-right corner of the curve is not at right angles but at rounded corners. Concerning the superposition effect of the bone-conduction component and the air-conduction component, the perception threshold curve obtained by the formula (9) can more accurately reflect the user's perception threshold, thus ensuring the accuracy of the user's hearing threshold after using the bone-conduction hearing aid.

In step 1320, the hearing threshold of the user after using the bone-conduction hearing aid is determined based on the perception threshold curve, the air-conduction hearing threshold, the air-conduction component input-output curve, the bone-conduction hearing threshold, and the bone-conduction component input-output curve.

In some embodiments, step 1320 may be performed by the processing module 220.

In some embodiments, taking the left ear as an example, the processing module 220 may determine the hearing threshold of the user after using the bone-conduction hearing aid based on the perception threshold curve, the air-conduction hearing threshold, the air-conduction component input-output curve, the bone-conduction hearing threshold, and the bone-conduction component input-output curve according to formula (10):

$$\begin{cases} AL2 = AL1 + SF \\ BL2 = BL1 + BSRL \\ STL = 20 * \log 10\left(10^\wedge \frac{(BL2 - BTM)}{20} + \cdot \right. \\ \left. 10^\wedge \frac{(AL2 - AT)}{20} * e^\wedge(-iw\Delta t2)\right) \end{cases} \tag{10}$$

The hearing threshold of the user's left ear after using the bone-conduction hearing aid may be obtained by the formula (10), and similarly, the hearing threshold of the user's right ear after using the bone-conduction hearing aid may be obtained by the formula (10).

In some embodiments of the present disclosure, based on the fact that superimposition of the bone-conduction component and the air-conduction component results in a lowering of the perception threshold, the perception threshold curve is used when determining the user's hearing threshold after using the bone-conduction hearing aid, which improves the accuracy of the determined hearing threshold.

In some embodiments, determining the hearing threshold of the user after using the bone-conduction hearing aid based on the air-conduction hearing threshold, the air-conduction component input-output curve, the bone-conduction hearing threshold, and the bone-conduction component input-output curve may include determining the hearing threshold of the user after using the bone-conduction hearing aid based on the air-conduction hearing threshold, the air-conduction component input-output curve, the bone-conduction hearing threshold, and the bone-conduction component input-output curve through a trained machine learning model. The trained machine learning model may be obtained by training using a plurality of sets of samples (bone-conduction hearing thresholds, air-conduction hearing thresholds, time differences of the air-conduction components relative to the bone-conduction components, air-conduction component input-output curves, and bone-conduction component input-output curves of different users). In some embodiments, the trained machine learning model may include, but is not limited to, a linear regression model (e.g., simple linear regression, ridge regression, Lasso regression, resilient network regression, Bayesian ridge regression, minimum regression angular regression bias, least squares regression, quantile regression), a neural network model, or the like.

When a sound is transmitted to the cochlea, the cochlea may convert the sound signal into an electrical signal, which is transmitted to an auditory center. When the electrical signal is transmitted in both ears at the same time, a binaural loudness superposition effect occurs, and the user's hearing threshold is further lowered by this binaural loudness superposition effect. Based on this, in order to more accurately determine the hearing threshold of the user after using the bone-conduction hearing aid, in some embodiments, the method for evaluating the hearing threshold of the user after using the bone-conduction hearing aid may further include determining a hearing aid gain based on a corrected sound field hearing threshold of the user and a corrected hearing threshold after using the bone-conduction hearing aid. More description of determining the hearing aid gain can be found in FIG. 14 and its description.

Figure 14:
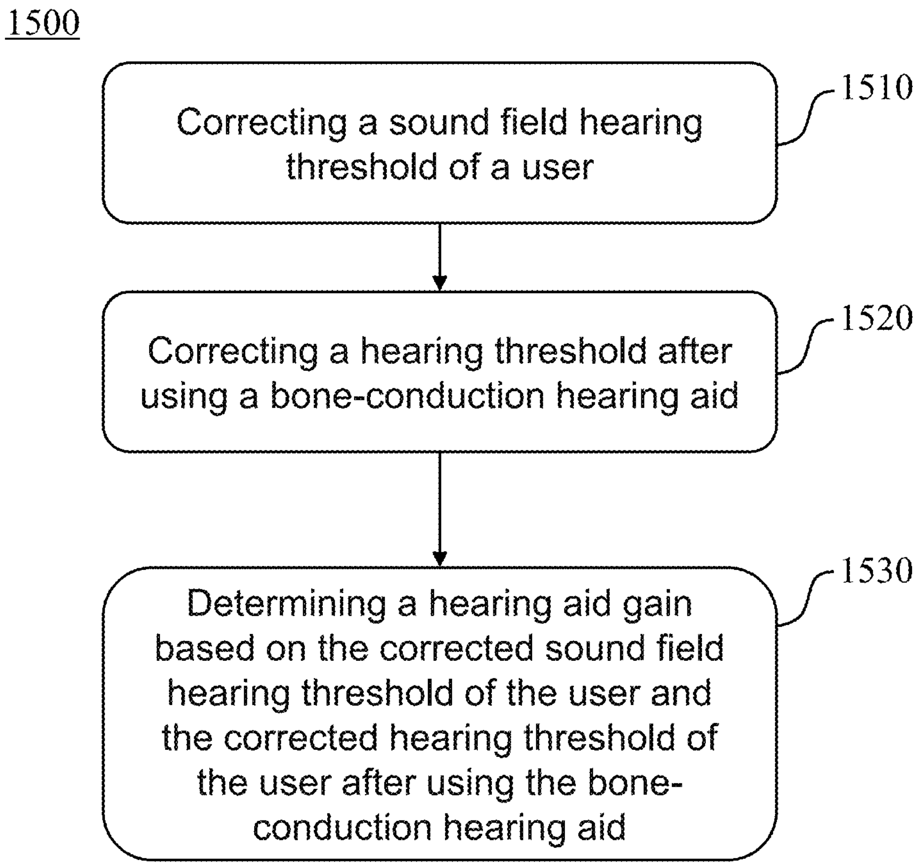
FIG. 14 is a flowchart illustrating determining a hearing aid gain according to some embodiments of the present disclosure.

FIG. 14 is a flowchart illustrating determining a hearing aid gain according to some embodiments of the present disclosure. In some embodiments, a process 1500 may be performed by the processing device 110. As shown in FIG. 14, the process 1500 may include following steps.

In step 1510, a sound field hearing threshold of a user is corrected.

In some embodiments, the step 1510 may be performed by the hearing threshold correction module 250.

The sound field hearing threshold refers to a smallest sound field source intensity that the human ear can just hear when broadcasting from a sound field source in a sound field. The sound field source intensity may be calibrated at a center of the human head. In some embodiments, the sound field hearing threshold may include a sound field hearing threshold of left ear and a sound field hearing threshold of right ear. In some embodiments, the sound field hearing threshold may include a bone-conduction hearing threshold and an air-conduction hearing threshold.

In some embodiments, the hearing threshold correction module 250 may use a binaural model for fitting to correct the user's sound field hearing threshold to determine the corrected sound field hearing threshold of the user.

In some embodiments, the hearing threshold correction module 250 may correct the user's sound field hearing threshold based on a difference between the user's sound field hearing threshold of the left ear and the sound field hearing threshold of the right ear, and a first amount of correction to determine the corrected sound field hearing threshold of the user. For example, the hearing threshold correction module 250 may subtract the first amount of correction from a minimum value of the user's sound field hearing threshold of the left ear and the sound field hearing threshold of the right ear to determine the corrected sound field hearing threshold of the user.

The first amount of correction refers to an amount of correction corresponding to the difference between the user's sound field hearing threshold of the left ear and the sound field hearing threshold of the right ear. The first amount of correction may be determined by querying a preset first table, the preset first table including values corresponding to different differences between sound field hearing thresholds of the left ear and sound field hearing thresholds of the right ear. The preset first table may be set based on experience.

In step 1520, the hearing threshold after using the bone-conduction hearing aid is corrected. In some embodiments, the step 1520 may be performed by the hearing threshold correction module 250.

In some embodiments, the hearing threshold correction module 250 may use the binaural model for fitting to correct the hearing threshold after using the bone-conduction hearing aid to determine the corrected hearing threshold after using the bone-conduction hearing aid.

In some embodiments, the hearing threshold correction module 250 may correct the hearing threshold after using the bone-conduction hearing aid based on a minimum value of the hearing threshold of the left ear after using the bone-conduction hearing aid and the hearing threshold of the right ear after using the bone-conduction hearing aid and a second amount of correction to determine the corrected hearing threshold after using the bone-conduction hearing aid. For example, the hearing threshold correction module 250 may subtract the second amount of correction from the difference between the hearing threshold of the left ear after using the bone-conduction hearing aid and the hearing threshold of the right ear after using the bone-conduction hearing aid to determine the corrected hearing threshold after using the bone-conduction hearing aid.

The second amount of correction refers to a correction amount corresponding to the difference between the hearing threshold of the left ear after using the bone-conduction hearing aid and the hearing threshold of the right ear after using the bone-conduction hearing aid. The second amount of correction may be determined by querying a second table, the second table includes values corresponding to different differences between hearing thresholds of the left ear after using the bone-conduction hearing aid and hearing thresholds of the right ear after using the bone-conduction hearing aid. The preset second table may be set based on experience.

In step 1530, the hearing aid gain is determined based on the corrected sound field hearing threshold of the user and the corrected hearing threshold of the user after using the bone-conduction hearing aid. In some embodiments, the step 1530 may be performed by the processing module 220.

In some embodiments, the processing module 220 may subtract the corrected hearing threshold of the user after using the bone-conduction hearing aid from the corrected sound field hearing threshold of the user to determine the hearing aid gain. For example, if the corrected sound field hearing threshold of the user is 50 dBHL and the corrected hearing threshold of the user after using the bone-conduction hearing aid is 45 dBHL, the processing module 220 may determine the hearing aid gain is 5 dB.

In some embodiments of the present disclosure, based on the fact that the binaural loudness superposition effect reduces the user's hearing threshold, by correcting the user's sound field hearing threshold and the hearing threshold of the user after using the bone-conduction hearing aid to determine the hearing aid gain, the accuracy of the determined hearing threshold can be further improved, thereby allowing for a more accurate hearing aid gain to be determined.

Figure 15:
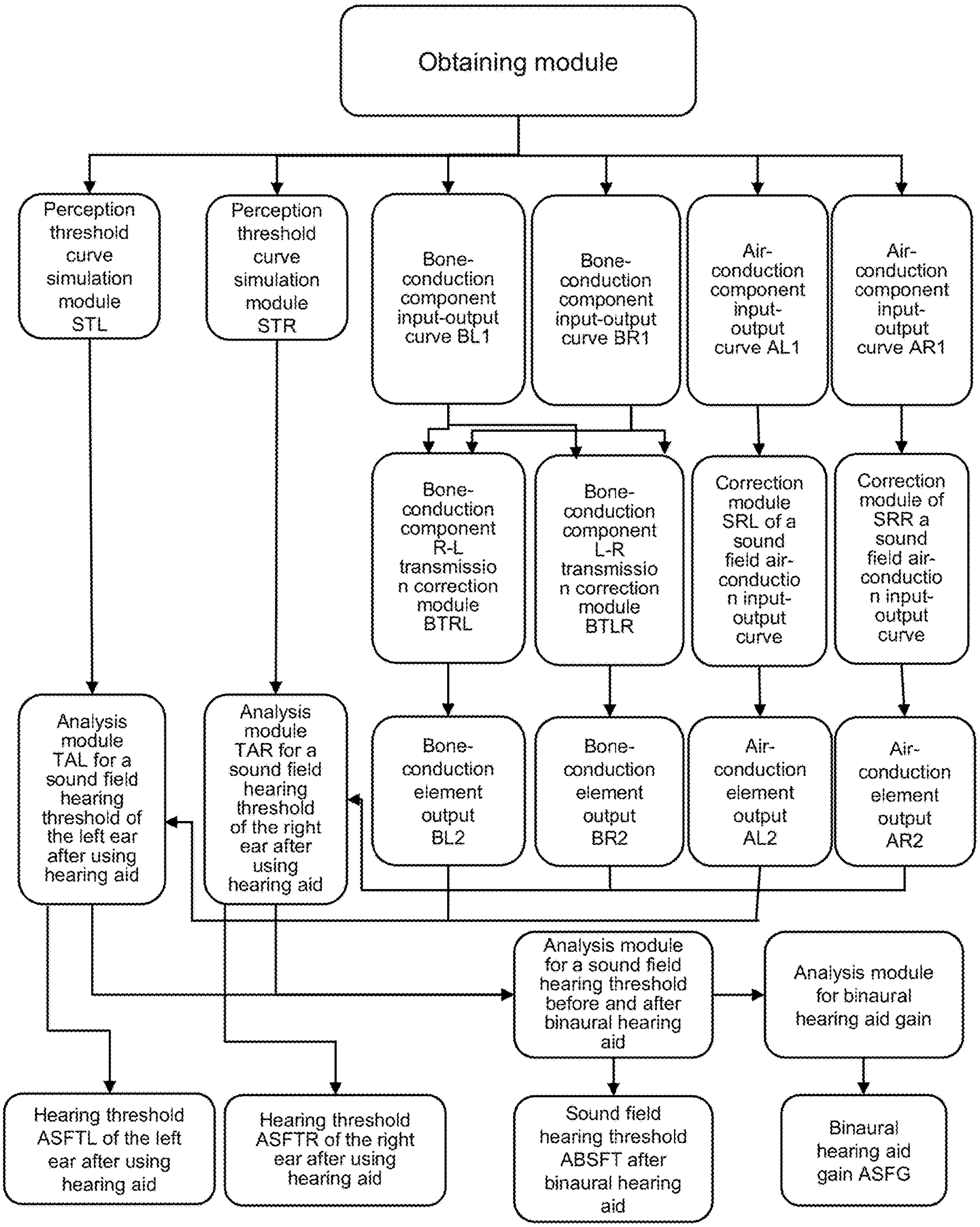
FIG. 15 is a schematic diagram illustrating an exemplary system for evaluating a hearing threshold of a user after using a bone-conduction hearing aid according to some embodiments of the present disclosure.

FIG. 15 is a schematic diagram illustrating an exemplary system for evaluating a threshold of a user after using a bone-conduction hearing aid according to some embodiments of the present disclosure.

As shown in FIG. 15, in some embodiments, an obtaining module may obtain a user's bone-conduction hearing threshold (e.g., a masked bone-conduction hearing threshold of left ear, a masked bone-conduction hearing threshold of right ear, an unmasked hearing threshold of left ear, and an unmasked hearing threshold of right ear) and an air-conduction hearing threshold (e.g., an air-conduction hearing threshold of left ear, an air-conduction hearing threshold of right ear). The description of obtaining the user's bone-conduction hearing threshold and the air-conduction hearing threshold may be referred to elsewhere in the present disclosure, and will not be repeated herein.

In some embodiments, the obtaining module may obtain a bone-conduction component input-output curve BL1 and a bone-conduction component input-output curve BR1 based on a preset parameter of a bone-conduction hearing aid, and input the curve BL1 and curve BR1 to a bone-conduction component R-L transmission correction module BTRL to obtain a bone-conduction element output BL2; and input the curve BL1 and curve BR1 to a bone-conduction component L-R transmission correction module BTLR to obtain a bone-conduction element output BR2. The bone conduction component input-output curve BL1 and the bone conduction component input-output curve BR1 here correspond to the bone conduction component input-output curves in other embodiments of the present disclosure, and the bone conduction element output BL2 and bone conduction element output BR2 correspond to the corrected bone conduction output curves in other embodiments of the present disclosure.

In some embodiments, the obtaining module may obtain an air-conduction component input-output curve AL1 and an air-conduction component input-output curve AR1 of the bone-conduction hearing aid based on the preset parameter of the bone-conduction hearing aid, and input the air-conduction component input-output curve AL1 and the air-conduction component input-output curve AR1 into a correction module SRL and a correction module SRR of a sound field air-conduction input-output curve, respectively, to obtain an air-conduction element output AL2 and an air-conduction element output AR2. The correction module SRL may be used to correct an air-conduction component received at the left ear, and the correction module SRR may used to correct an air-conduction component received at the right ear, where the influence of an external sound field is considered while correcting the air-conduction component at the left ear and the bone-conduction component at the right ear. The air-conduction component input-output curve AL1 and the air-conduction component output AR1 herein correspond to the air-conduction component input-output curve (e.g., an air-conduction component of the left ear before correction and a corrected air-conduction component of the right ear) in other embodiments of the present disclosure. The air-conduction element output AL2 corresponds to the corrected air-conduction component of the left ear AL2 in other embodiments of the present disclosure, and the air-conduction element output AR2 corresponds to the corrected air-conduction component of the right ear in other embodiments of the present disclosure.

A perception threshold curve simulation module STL may obtain a perception threshold curve for the left ear based on a bone-conduction hearing threshold of the left ear (e.g., a masked bone-conduction hearing threshold of the left ear) and an air-conduction hearing threshold of the left ear obtained by the obtaining module, and a perception threshold curve simulation module STR may obtain a perception threshold curve for the right ear based on a bone-conduction hearing threshold of the right ear (e.g., a masked bone-conduction hearing threshold of the right ear) and an air-conduction hearing threshold of the right ear obtained by the obtaining module. An analysis module TAL for a sound field hearing threshold of the left ear after using hearing aid may determine a hearing threshold ASFTL of the left ear after using hearing aid based on the perception threshold curve of the left ear, the bone-conduction element output BL2, and the air-conduction element output AL2. An analysis module TAR for a sound field hearing threshold of the right ear after using hearing aid may determine a hearing threshold ASFTR of the right ear after using hearing aid based on the perception threshold curve of the right ear, the bone-conduction element output BR2, and the air-conduction element output AR2.

The perception threshold curve simulation module STL and the perception threshold curve simulation module STR may correspond to the perception threshold curve simulation module 240 in FIG. 2, and the analysis module TAL for a sound field hearing threshold of the left ear after using hearing aid and an analysis module TAR for a sound field hearing threshold of the right ear after using hearing aid may correspond to the hearing threshold correction module 250 in FIG. 2.

As shown in FIG. 15, an analysis module for a sound field hearing threshold before and after binaural hearing aid may be used to determine a sound field hearing threshold ABSFT after binaural hearing aid together with the analysis module TAL for a sound field hearing threshold of the left ear after using hearing aid and the analysis module TAR for a sound field hearing threshold of the right ear after using hearing aid, and an analysis module for binaural hearing aid gain may be used to obtain a binaural hearing aid gain ASFG with the analysis module for a sound field hearing threshold before and after binaural hearing aid.

The analysis module for a sound field hearing threshold before and after binaural hearing aid may correspond to the processing module 220 in FIG. 2.

More description regarding each of the above modules obtaining an output based on an input can be found elsewhere in the present disclosure.

The basic concepts have been described above, and it is apparent to those skilled in the art that the foregoing detailed disclosure serves only as an example and does not constitute a limitation of the present disclosure. Although not explicitly stated here, those skilled in the art may make various modifications, improvements and amendments to the present disclosure. These alterations, improvements, and modifications are intended to be suggested by the present disclosure, and are within the spirit and scope of the exemplary embodiments of the present disclosure.

Moreover, certain terminology has been used to describe embodiments of the present disclosure. As in “an embodiment”, “one embodiment”, and/or “some embodiments” means a feature, structure, or characteristic associated with at least one embodiment of the present disclosure. Accordingly, it should be emphasized and noted that two or more references to “an embodiment”, “one embodiment” or “an alternative embodiment” in different places in the present disclosure do not necessarily refer to the same embodiment. In addition, some features, structures, or features in the present disclosure of one or more embodiments may be appropriately combined.

Furthermore, it will be appreciated by those skilled in the art that aspects of the present disclosure may be illustrated and described by a number of patentable varieties or circumstances, including any new and useful process, machine, product, or combination of substances, or any of their new and useful improvements. Accordingly, all aspects of the present disclosure may be performed entirely by hardware, may be performed entirely by software (including firmware, resident software, microcode, etc.), or may be performed by a combination of hardware and software. The above hardware or software may be referred to as “data block”, “module”, “engine”, “unit”, “component” or “system”. In addition, aspects of the present disclosure may appear as a computer product located in one or more computer-readable media, the product including computer-readable program code.

Computer storage media may contain a propagated data signal embedded with a computer program code, for example, on a baseband or as part of a carrier. The propagation signal may have a variety of manifestations, including an electromagnetic form, an optical form, or the like, or suitable combinations thereof. The computer storage medium may be any computer-readable medium, other than a computer-readable storage medium, which may be used by connecting to an instruction-executing system, device, or apparatus for communicating, propagating, or transmitting for use. Program code disposed on the computer storage medium may be disseminated via any suitable medium, including radio, cable, fiber optic cable, RF, or the like, or a combination of any of the foregoing.

The computer program code required for the operation of the various portions of the present disclosure may be written in any one or more of a number of programming languages, including object-oriented programming languages such as Java, Scala, Smalltalk, Eiffel, JADE, Emerald, C++, C#, VB.NET, Python, etc., conventional procedural programming languages such as C, Visual Basic, Fortran 2003, Perl, COBOL 2002, PHP, ABAP, dynamic programming languages such as Python, Ruby and Groovy, or other programming languages. The program code can be run entirely on the user’s computer, or as a stand-alone package on the user’s computer, or partially on the user’s computer and partially on a remote computer, or entirely on a remote computer or server. In the latter case, the remote computer can be connected to the user’s computer through any form of network, such as a local area network (LAN) or wide area network (WAN), or connected to an external computer (e.g., via the Internet), or in a cloud computing environment, or used as a service such as software as a service (SaaS).

In addition, the order of processing elements and sequences, the use of numerical letters, or the use of other names described herein are not intended to qualify the order of the processes and methods of the present disclosure unless expressly stated in the claims. Although the above disclosure discusses through various examples what is currently considered to be a variety of useful embodiments of the present disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

Some embodiments use numbers describing the number of components, attributes, and it should be understood that such numbers used in the description of embodiments are modified in some examples by the modifiers "approximately", "nearly", or "substantially". Unless otherwise noted, the terms "approximately," "nearly," or "substantially" indicates that a ±20% variation in the stated number is allowed. Correspondingly, in some embodiments, the numerical parameters used in the present disclosure and claims are approximations, which approximations are subject to change depending on the desired characteristics of individual embodiments. In some embodiments, the numerical parameters should take into account the specified number of valid digits and utilize a general digit retention method. While the numerical domains and parameters used to confirm the breadth of their ranges in some embodiments of the present disclosure are approximations, in specific embodiments, such values are set to be as precise as possible within a feasible range.

For each patent, patent application, patent application disclosure, and other material cited in the present disclosure, such as articles, books, specifications, publications, documents, etc., the entire contents of which are hereby incorporated herein by reference. Except for application history documents that are inconsistent with or conflict with the contents of the present disclosure, and except for documents (currently or hereafter appended to the present disclosure) that limit the broadest scope of the claims of the present disclosure. It should be noted that in the event of any inconsistency or conflict between the descriptions, definitions, and/or use of terms in the materials appurtenant to the present disclosure and those set forth herein, the descriptions, definitions, and/or use of terms in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for evaluating a hearing threshold of a user after using a bone-conduction hearing aid, comprising:

obtaining a bone-conduction hearing threshold of the user;

obtaining a bone-conduction component input-output curve of the bone-conduction hearing aid, wherein the bone-conduction component input-output curve is a relationship curve between a sound pressure level at a microphone of the bone-conduction hearing aid and a bone-conduction force level output by the bone-conduction hearing aid, and a sound is transmitted into the microphone; and determining the hearing threshold of the user after using the bone-conduction hearing aid based on the bone-conduction hearing threshold of the user and the bone-conduction component input-output curve of the bone-conduction hearing aid.

2. The method of claim 1, wherein the obtaining a bone-conduction component input-output curve includes:

obtaining a bone-conduction output curve of a left ear of the user and a bone-conduction output curve of a right ear of the user; and obtaining a corrected bone-conduction output curve of the left ear and a corrected bone-conduction output curve of the right ear by correcting an intensity of a bone-conduction component in the bone-conduction output curve of the left ear and an intensity of a bone-conduction component in the bone-conduction output curve of the right ear.

3. The method of claim 2, wherein the correcting an intensity of a bone-conduction component in the bone-conduction output curve of the left ear and an intensity of a bone-conduction component in the bone-conduction output curve of the right ear includes:

adding a transmission bone-conduction component from the right ear to the left ear to the intensity of the bone-conduction component in the bone-conduction output curve of the left ear; and adding a transmission bone-conduction component from the left ear to the right ear to the intensity of the bone-conduction component in the bone-conduction output curve of the right ear.

4. The method of claim 1, wherein the obtaining a bone-conduction component input-output curve includes:

determining the bone-conduction component input-output curve based on at least one preset parameter of the bone-conduction hearing aid.

5. The method of claim 1, wherein the obtaining a bone-conduction component input-output curve includes:

obtaining a sound pressure of a test air-conduction sound and the bone-conduction force level generated by the bone-conduction hearing aid under the action of the test air-conduction sound; and determining the bone-conduction component input-output curve based on the sound pressure of the test air-conduction sound and the bone-conduction force level.

6. The method of claim 1, further comprising:

obtaining an air-conduction hearing threshold of the user; and obtaining an air-conduction component input-output curve of the bone-conduction hearing aid, wherein the air-conduction component input-output curve refers to a relationship curve between the sound pressure at the microphone of the bone-conduction hearing aid and an air-conduction hearing level output from the bone-conduction hearing aid, wherein the determining the hearing threshold of the user after using the bone-conduction hearing aid includes:

determining the hearing threshold of the user after using the bone-conduction hearing aid based on the air-conduction hearing threshold, the air-conduction component input-output curve, the bone-conduction hearing threshold, and the bone-conduction component input-output curve.

7. The method of claim 6, wherein the obtaining an air-conduction component input-output curve includes:

determining the air-conduction component input-output curve based on at least one preset parameter of the bone-conduction hearing aid.

8. The method of claim 6, wherein the obtaining an air-conduction component input-output curve includes:

obtaining a sound pressure of a test air-conduction sound and an air-conduction sound pressure generated by the bone-conduction hearing aid under the action of the test air-conduction sound; and determining the air-conduction component input-output curve based on the sound pressure of the test air-conduction sound and the air-conduction hearing level.

9. The method of claim 6, wherein the obtaining an air-conduction component input-output curve includes:

obtaining a perception threshold curve of the user for a bone-conduction sound and an air-conduction sound; and determining the hearing threshold of the user after using the bone-conduction hearing aid based on the perception threshold curve, the air-conduction hearing threshold, the air-conduction component input-output curve, the bone-conduction hearing threshold, and the bone-conduction component input-output curve.

10. The method of claim 9, further comprising:

correcting a sound field hearing threshold of the user;

correcting the hearing threshold after using the bone-conduction hearing aid; and determining a hearing aid gain based on the corrected sound field hearing threshold of the user and the corrected hearing threshold after using the bone-conduction hearing aid.

11. A device for evaluating a hearing threshold of a user after using a bone-conduction hearing aid, comprising a processor and a memory, wherein the memory is configured to store instructions, and when executing the instructions, the processor causes the device to perform operations comprising:

obtaining a bone-conduction hearing threshold of the user;

obtaining a bone-conduction component input-output curve of the bone-conduction hearing aid, wherein the bone-conduction component input-output curve is a relationship curve between a sound pressure level at a microphone of the bone-conduction hearing aid and a bone-conduction force level output by the bone-conduction hearing aid, and a sound is transmitted into the microphone; and determining the hearing threshold of the user after using the bone-conduction hearing aid based on the bone-conduction hearing threshold of the user and the bone-conduction component input-output curve of the bone-conduction hearing aid.

12. The device of claim 11, wherein the obtaining a bone-conduction component input-output curve includes:

obtaining a bone-conduction output curve of a left ear of the user and a bone-conduction output curve of a right ear of the user;

obtaining a corrected bone-conduction output curve of the left ear and a corrected bone-conduction output curve of the right ear by correcting an intensity of a bone-conduction component in the bone-conduction output curve of the left ear and an intensity of a bone-conduction component in the bone-conduction output curve of the right ear.

13. The device of claim 12, wherein the correcting an intensity of a bone-conduction component in the bone-conduction output curve of the left ear and an intensity of a bone-conduction component in the bone-conduction output curve of the right ear includes:

adding a transmission bone-conduction component from the right ear to the left ear to the intensity of the bone-conduction component in the bone-conduction output curve of the left ear; and adding a transmission bone-conduction component from the left ear to the right ear to the intensity of the bone-conduction component in the bone-conduction output curve of the right ear.

14. The system of claim 11, wherein the obtaining a bone-conduction component input-output curve includes:

determining the bone-conduction component input-output curve based on at least one preset parameter of the bone-conduction hearing aid.

15. The device of claim 11, wherein the obtaining a bone-conduction component input-output curve includes:

obtaining a sound pressure of a test air-conduction sound and the bone-conduction force level generated by the bone-conduction hearing aid under the action of the test air-conduction sound; and determining the bone-conduction component input-output curve based on the sound pressure of the test air-conduction sound and the bone-conduction force level.

16. The device of claim 11, the operations further comprising:

obtaining an air-conduction hearing threshold of the user; and obtaining an air-conduction component input-output curve of the bone-conduction hearing aid, wherein the air-conduction component input-output curve is a relationship curve between the sound pressure at a microphone of the bone-conduction hearing aid and an air-conduction hearing level output from the bone-conduction hearing aid, wherein the determining the hearing threshold of the user after using the bone-conduction hearing aid includes:

determining the hearing threshold of the user after using the bone-conduction hearing aid based on the air-conduction hearing threshold, the air-conduction component input-output curve, the bone-conduction hearing threshold, and the bone-conduction component input-output curve.

17. The device of claim 16, wherein the obtaining an air-conduction component input-output curve includes:

obtaining a sound pressure of a test air-conduction sound and an air-conduction sound pressure generated by the bone-conduction hearing aid under the action of the test air-conduction sound; and determining the air-conduction component input-output curve based on the sound pressure of the test air-conduction sound and the air-conduction hearing level.

18. The device of claim 16, the operations further comprising:

obtaining a perception threshold curve of the user for a bone-conduction sound and an air-conduction sound; and determining the hearing threshold of the user after using the bone-conduction hearing aid based on the perception threshold curve, the air-conduction hearing threshold, the air-conduction component input-output curve, the bone-conduction hearing threshold, and the bone-conduction component input-output curve.

19. The device of claim 18, the operations further comprising:

correcting a sound field hearing threshold of the user;

correcting the hearing threshold after using the bone-conduction hearing aid; and determining a hearing aid gain based on the corrected sound field hearing threshold of the user and the corrected hearing threshold after using the bone-conduction hearing aid.

20. A non-transitory computer-readable storage medium, wherein the storage medium stores computer instructions, and when reading the computer instructions in the storage medium, a computer executes operations comprising:

obtaining a bone-conduction hearing threshold of the user;

obtaining a bone-conduction component input-output curve of the bone-conduction hearing aid, wherein the bone-conduction component input-output curve is a relationship curve between a sound pressure level at a microphone of the bone-conduction hearing aid and a bone-conduction force level output by the bone-conduction hearing aid, and a sound is transmitted into the microphone; and determining the hearing threshold of the user after using the bone-conduction hearing aid based on the bone-conduction hearing threshold of the user and the bone-conduction component input-output curve of the bone-conduction hearing aid.

* * * * *